US012783918B2

(12) United States Patent
Singh et al.

(10) Patent No.: US 12,783,918 B2
(45) Date of Patent: Nov. 3, 2026

(54) COMPONENT HEALTH DETERMINATION AND REPORTING SYSTEM

(71) Applicant: Dell Products L.P., Round Rock, TX (US)

(72) Inventors: Ashutosh Singh, Austin, TX (US); Joe Ray, Austin, TX (US)

(73) Assignee: Dell Products L.P., Round Rock, TX (US)

(*) Notice: Subject to any disclaimer, the term of this patent is extended or adjusted under 35 U.S.C. 154(b) by 884 days.

(21) Appl. No.: 17/970,757

(22) Filed: Oct. 21, 2022

(65) Prior Publication Data

US 2024/0135208 A1 Apr. 25, 2024
US 2024/0232662 A9 Jul. 11, 2024

(51) Int. Cl.
*G06F 11/00* (2006.01)
*G06F 11/34* (2006.01)
*G06N 5/04* (2023.01)

(52) U.S. Cl.
CPC ........... *G06N 5/04* (2013.01); *G06F 11/3495* (2013.01)

(58) Field of Classification Search
None
See application file for complete search history.

(56) References Cited

U.S. PATENT DOCUMENTS 8,843,781 B1* 9/2014 Chiang ............... G06F 11/0745 714/42
2011/0154123 A1* 6/2011 Barrall ................ G06F 11/0727 714/E11.159
2016/0371170 A1* 12/2016 Salunke ................ G06F 11/302
2017/0220505 A1* 8/2017 Breakstone ......... G06F 13/4282
2017/0329736 A1* 11/2017 Yu ......................... G06F 3/0683
2019/0163546 A1* 5/2019 Ungar ................... G06F 11/079
2020/0134421 A1* 4/2020 Suthar .................... G06N 3/045
2021/0073086 A1* 3/2021 Bannur Subraya .......................... G06F 11/3476
2021/0383206 A1* 12/2021 Teppoeva ............... G06N 3/044
2022/0019461 A1* 1/2022 Balle ...................... G06F 9/4856
2022/0068050 A1* 3/2022 Kibbar ................ G01M 17/007
2022/0398123 A1* 12/2022 Venkataraman ........ G06F 9/485
2023/0096637 A1* 3/2023 Syed ....................... G06F 3/061 714/37
2023/0251953 A1* 8/2023 Joshi ..................... G06F 11/302 714/38.1

(Continued)

OTHER PUBLICATIONS

Deutsch, "Generating Neural Networks with Neural Networks" (Year: 2018).*

(Continued)

*Primary Examiner* — Bryce P Bonzo
*Assistant Examiner* — Gabriella Kanani Shelton
(74) *Attorney, Agent, or Firm* — Joseph Mencher

(57) ABSTRACT

A component health determination and reporting system includes a computing device having a computing device component. The computing device component includes computing device component subsystem(s) coupled to a health report generation subsystem. The health report generation subsystem receives telemetry data from each of the computing device component subsystem(s), performs data compaction operations on the telemetry data to generate compacted telemetry data, performs inference operations on the compacted telemetry data to generate a health report for the computing device component, and provides the health report to the computing device.

20 Claims, 24 Drawing Sheets

(56) References Cited

U.S. PATENT DOCUMENTS

2024/0111446 A1* 4/2024 Paramesh ........... G06F 11/2733

OTHER PUBLICATIONS

Novak, "Cisco UCS for beginners—an end-user's overview" (Year: 2014).*

Hertz, "Microchip Targets Data Centers With RAID-on-chip in PCIe Storage Controller" (Year: 2022).*

Hands, "Monitoring the Health of NVMe SSDs," TechTarget (Year: 2021).*

Wikipedia, "Self-Monitoring, Analysis and Reporting Technology" (Year: 2026).*

Bayraktaroglu et al., "Concurrent Application of Compaction and Compression for Test Time and Data Volume Reduction in Scan Designs," IEEE Transactions on Computers, vol. 52, No. 11, Nov. 2003, pp. 1480-1489, [Retrieved on Oct. 18, 2022], Retrieved from IEEE Xplore.

Tang et al., "Enabling Deep Learning on IoT Devices," The IoT Connection, Computer, vol. 50, No. 10, Oct. 2017, pp. 92-96, Published by the IEEE Computer Society, [Retrieved on Oct. 18, 2022], Retrieved from IEEE Xplore.

Zhao et al., "DeepThings: Distributed Adaptive Deep Learning Inference on Resource-Constrained IoT Edge Clusters," IEEE Transactions on Computer-Aided Design of Integrated Circuits and Systems, vol. 37, No. 11, Nov. 2018, pp. 2348-2359, [Retrieved on Oct. 18, 2022], Retrieved from IEEE Xplore, Digital Object Identifier 10.1109/TCAD.2018.2858384.

Lu et al., "Research on Cassandra Data Compaction Strategies for Time-Series Data," Journal of Computers, vol. 11, No. 6, Nov. 2016, pp. 504-512, doi: 10.17706/jcp.11.6.504-512.

Jensen et al., "Time Series Management Systems: A Survey," IEEE Transactions on Knowledge and Data Engineering, vol. 29, No. 11, Nov. 2017, pp. 2581-2600 [Retrieved on Oct. 18, 2022], Retrieved from IEEE Xplore, Digital Object Identifier No. 10.1109/TKDE.2017.2740932.

* cited by examiner

COMPONENT HEALTH DETERMINATION AND REPORTING SYSTEM

BACKGROUND

The present disclosure relates generally to information handling systems, and more particularly to determining and reporting the health of components in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices, desktop computing devices, laptop/notebook computing devices, tablet computing devices, mobile phones, and/or other computing devices known in the art, often have their health monitored and reported in order to ensure issues associated with the computing device are addressed and unavailability of the computing device is minimized. For example, conventional computing device health determination and reporting systems utilize a Central Processing Unit (CPU) in the computing device to collect telemetry data from computing device components in the computing device, and then provide that telemetry data via a network to a health report generation system that uses that telemetry data to generate a health report for the computing device. The health report generation system may then transmit that health report via the network to the computing device for display to a user. However, such conventional computing device health determination and reporting systems suffer from several issues, particularly when utilized in computing devices provided in "edge" environments.

For example, the network-connected and centralized health report generation described above requires relatively large amounts of telemetry data to be collected and transmitted via the network between the computing device and the health report generation system, stored, and analyzed. When the analysis of the telemetry data is performed using models trained on individual datapoints provided by the telemetry data, those models can be susceptible to anomalies in the telemetry data (e.g., anomalies caused by electromagnetic noise, transducer malfunctions, etc.) that can introduce missing datapoints that require imputation before the telemetry data may be provided to the model, that may result in the model producing false health report alerts, and/or that may suffer from other telemetry-data-anomaly-related issues known in the art. Furthermore, commercially available toolkits that enable the models discussed above are often optimized for particular processing systems and do not scale easily or efficiently across different computing device manufacturers, and are often designed to provide models across a wide variety of platforms via their inclusion of reverse mapping capabilities and supporting infrastructure that ensures wide-scale usability, scalability, and flexibility at the expense of storage space (which may be limited in the computing devices provided in the "edge" environments discussed above).

As will be appreciated by one of skill in the art in possession of the present disclosure, the desire to provide health determination and reporting for computing devices continues to grow, and as the centralized health report generation discussed above is performed for an increasing number of computing devices, the health report generation infrastructure must be expanded, which increases costs associated with health determination and reporting. Furthermore, the telemetry data collection and transmission discussed above can consume a relatively large amount of the processing resources in the computing device, and can introduce latency into the health determination and reporting process that can be exacerbated when network congestion, network outages, and/or other network issues introduce delays that can render the health determination and reporting operations ineffective. Solutions to such issues include reducing the telemetry data provisioning frequency for any particular computing devices, and/or reducing the amount of telemetry data provided via the network to the health report generation system by transmitting subsets of the telemetry data (e.g., a snapshot of the telemetry data) based on predetermine rules.

However, solutions like the reduced telemetry data provisioning frequency or telemetry data snapshots discussed above may provide the health report generation system with a telemetry data subset that represents a limited or momentary state of the computing device, as such limited subsets of the telemetry data may not capture or represent a holistic view of the operational state of the computing device. As will be appreciated by one of skill in the art in possession of the present disclosure, relatively robust computing device health determinations require comprehensive information about different computing device operational states and computing device operational state transitions, and reduced telemetry data provisioning frequency techniques and/or telemetry data subset provisioning techniques like the snapshots described above often result in a pseudorandomized data collection process that can lead to relatively significant telemetry data loss and inaccurate health reports for computing devices.

Accordingly, it would be desirable to provide a health determination and reporting system that addresses the issues discussed above.

SUMMARY

According to one embodiment, an Information Handling System (IHS) includes a component chassis; a processing system that is included in the component chassis; and a memory system that is included in the component chassis, that is coupled to the processing system, and that includes instructions that, when executed by the processing system, cause the processing system to provide a health report generation engine that is configured to: receive telemetry data from each of at least one component subsystem included in the component chassis; perform data compaction operations on the telemetry data to generate compacted telemetry data; perform inference operations on the compacted telemetry data to generate a health report for the IHS; and provide the health report to a computing device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
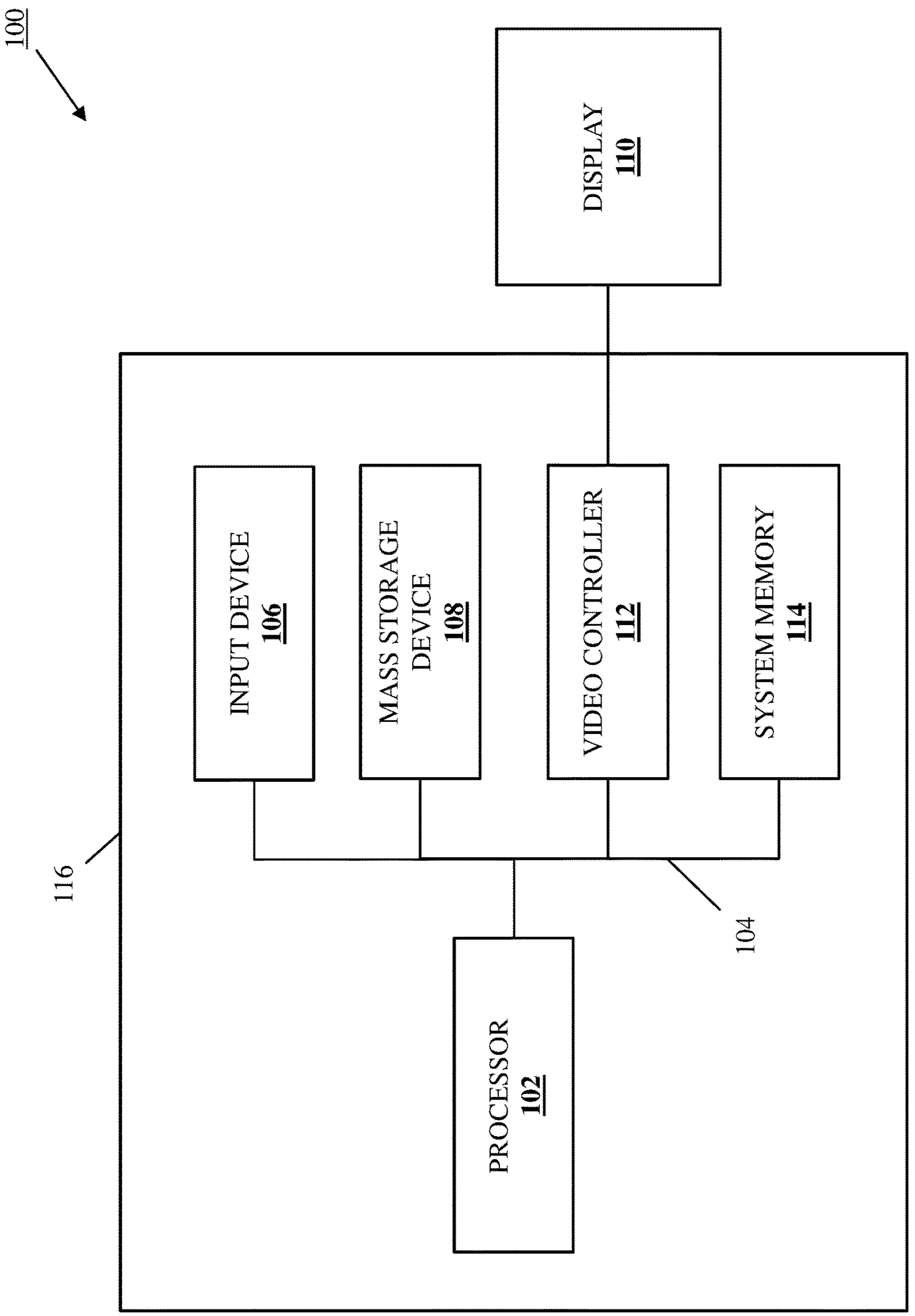
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
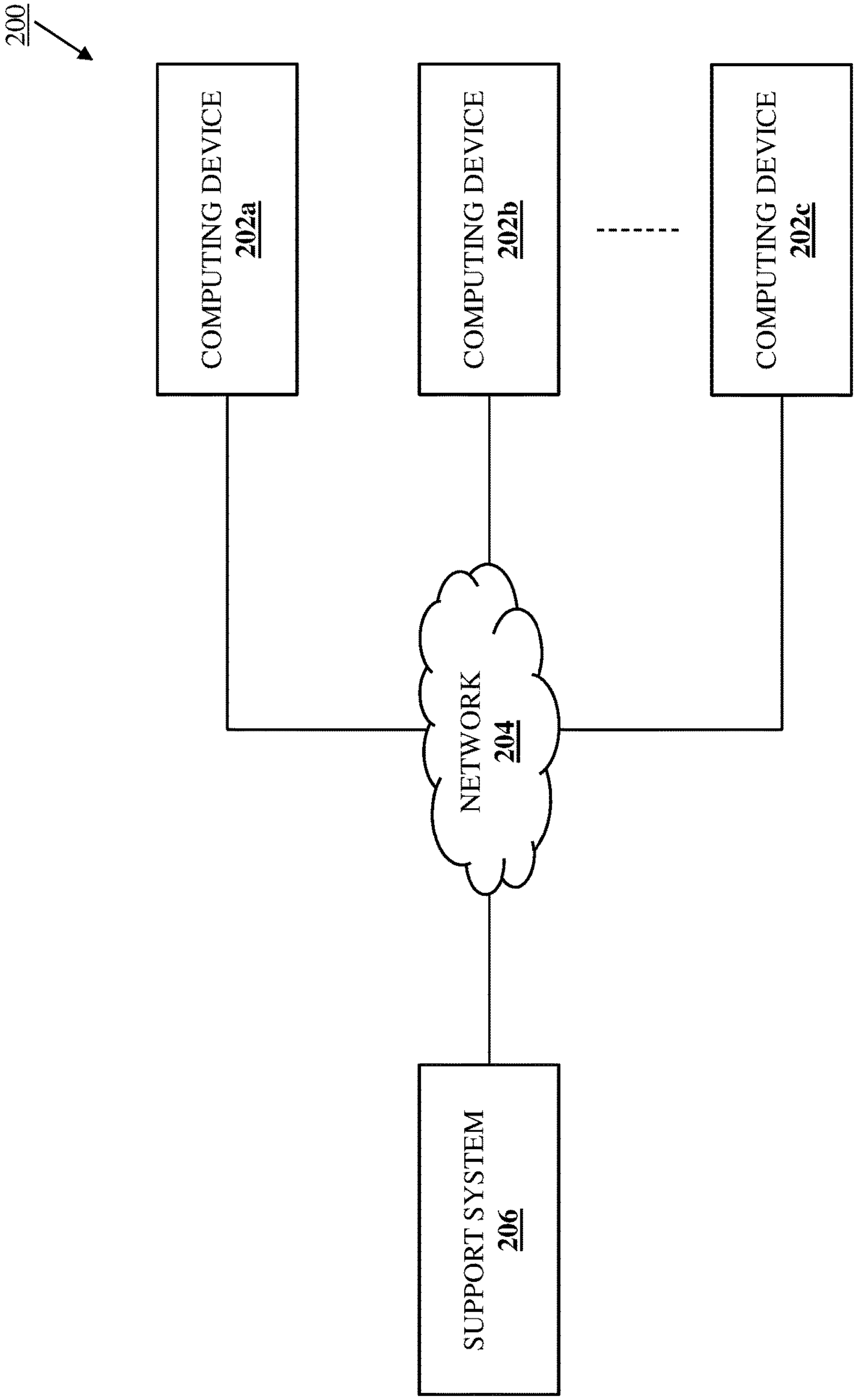
FIG. 2 is a schematic view illustrating an embodiment of a networked system that may provide the component health determination and reporting system of the present disclosure.

Referring now to FIG. 2, an embodiment of a networked system 200 that may provide the component health determination and reporting system of the present disclosure is illustrated. In the illustrated embodiment, the networked system 200 includes a plurality of computing devices 202*a*, 202*b*, and up to 202*c*. In an embodiment, any or all of the computing devices 202*a*-202*c* may be provided by the IHS 100 discussed above with reference to FIG. 1, and/or may include some or all of the components of the IHS 100, and in specific examples may be provided by server devices, storage devices, networking devices (e.g., switch devices, router devices, etc.), desktop computing devices, laptop/notebook computing devices, tablet computing devices, mobile phones, Internet of Things (IoT) computing devices, and/or any other computing device that would be apparent to one of skill in the art in possession of the present disclosure. However, while illustrated and discussed as being provided by particular computing devices, one of skill in the art in possession of the present disclosure will recognize that computing devices provided in the networked system 200 may include any devices that may be configured to operate similarly as the computing devices 202*a*-202*c* discussed below.

In the illustrated embodiment, the computing devices 202*a*-202*c* are coupled to a network 204 that may be provided by a Local Area Network (LAN), the Internet, combinations thereof, and/or any other network that would be apparent to one of skill in the art in possession of the present disclosure. As illustrated, a support system 206 may be coupled to the computing devices 202*a*-202*c* via the network 204. In an embodiment, the support system 206 may be provided by the IHS 100 discussed above with reference to FIG. 1, and/or may include some or all of the components of the IHS 100, and may be provided by server devices, desktop computing devices, laptop/notebook computing devices, and/or any other computing device that would be apparent to one of skill in the art in possession of the present disclosure. In a specific example, the support system 206 may be configured to provide SUPPORTASSIST® functionality available via support systems provided by DELL® Inc. of Round Rock, Texas, United States. However, while illustrated and discussed as being provided by particular computing devices providing particular computing device support functionality, one of skill in the art in possession of the present disclosure will recognize that support systems provided in the networked system 200 may include any devices that may be configured to operate similarly as the support system 206 discussed below. As such, while a specific networked system 200 has been illustrated and described, one of skill in the art in possession of the present disclosure will recognize that the component health report determination and reporting system of the present disclosure may be provided using a variety of components and component configurations while remaining within the scope of the present disclosure as well.

Figure 3:
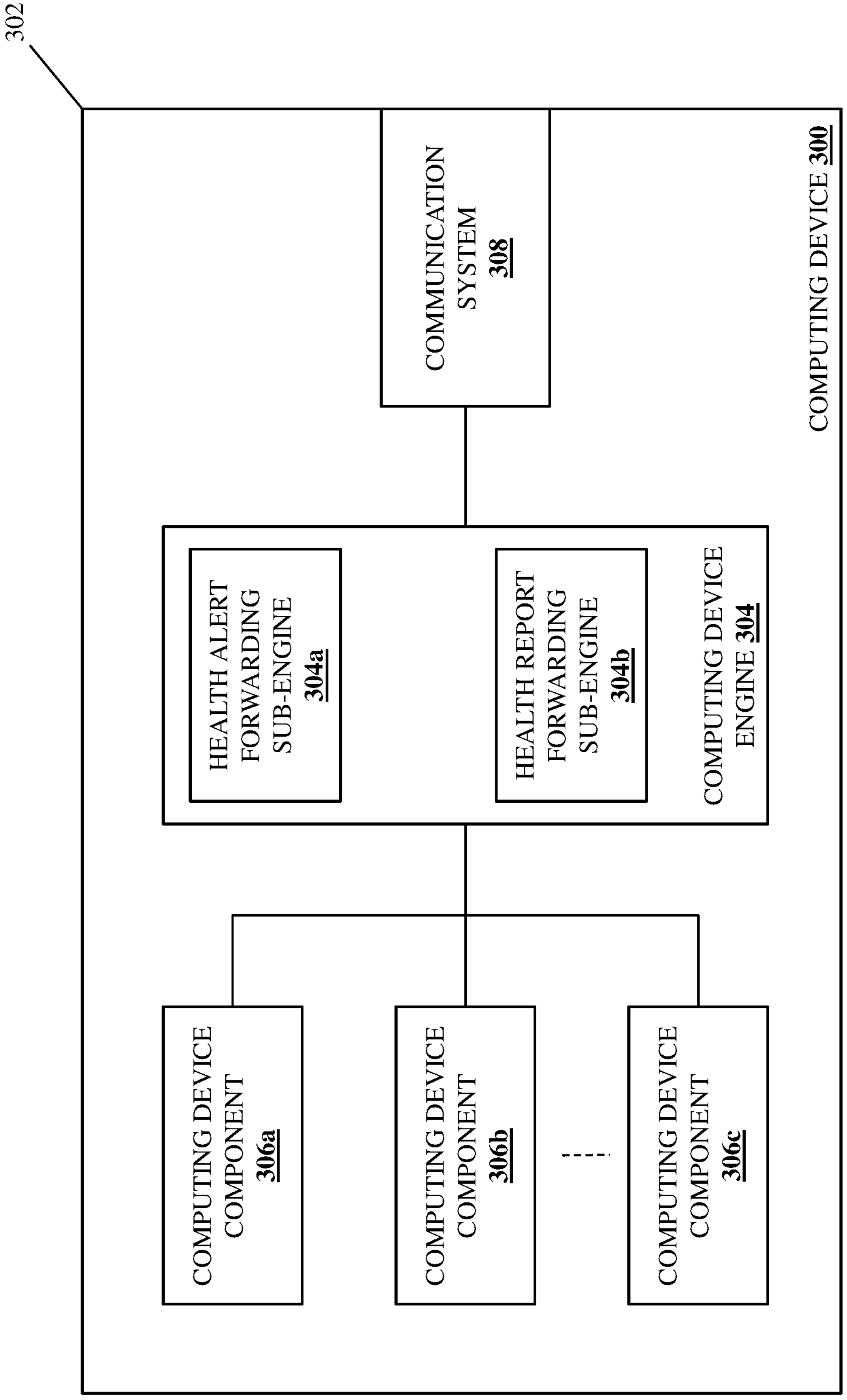
FIG. 3 is a schematic view illustrating an embodiment of a computing device that may be included in the networked system of FIG. 2 and that may provide the component health determination and reporting system of the present disclosure.

Referring now to FIG. 3, an embodiment of a computing device 300 is illustrated that may provide any of the computing devices 202*a*-202*c* discussed above with reference to FIG. 2. As such, the computing device 300 may be provided by the IHS 100 discussed above with reference to FIG. 1 and/or may include some or all of the components of the IHS 100, and in specific examples may be provided by server devices, storage devices, networking devices (e.g., switch devices, router devices, etc.), desktop computing devices, laptop/notebook computing devices, tablet computing devices, mobile phones, Internet of Things (IoT) computing devices, and/or any other computing device that would be apparent to one of skill in the art in possession of the present disclosure. However, while illustrated and discussed as being provided by particular computing devices, one of skill in the art in possession of the present disclosure will recognize that the computing device 300 may be provided by other computing devices while remaining within the scope of the present disclosure as well.

In the illustrated embodiment, the computing device 300 includes a chassis 302 that houses the components of the computing device 300, only some of which are illustrated and discussed below. For example, the chassis 302 may house a processing system (not illustrated, but which may include the processor 102 discussed above with reference to FIG. 1 such a Central Processing Unit (CPU) or other "host" processors that would be apparent to one of skill in the art in possession of the present disclosure) and a memory system (not illustrated, but which may include the memory 114 discussed above with reference to FIG. 1 such as Dynamic Random Access Memory (DRAM) systems and/or other "host" memory systems that would be apparent to one of skill in the art in possession of the present disclosure) that is coupled to the processing system and that includes instructions that, when executed by the processing system, cause the processing system to provide a computing device engine 304 that is configured to perform the functionality of the computing device engines and/or computing devices discussed below.

In the specific example provided in FIG. 3, the computing device engine 304 includes a health alert forwarding sub-engine 304*a* that is configured to receive the health reports generated as discussed below and provide health alerts included therein via a network, for display on a display device, and/or in other manners that would be apparent to one of skill in the art in possession of the present disclosure. The illustrated embodiment of the computing device engine 304 also includes a health report forwarding sub-engine 304*b* that is configured to receive the compacted telemetry data and health reports generated as discussed below and provide them via a network to the support system 206 discussed above with reference to FIG. 2, and/or in other manners that would be apparent to one of skill in the art in possession of the present disclosure. However, while two specific sub-engines and associated functionality are illustrated and described, one of skill in the art in possession of the present disclosure will appreciate how the computing device engine 304 may be configured to perform other functionality (e.g., any of a variety of "host" compute operations, other health report operations, other compacted telemetry data operations, etc.) while remaining within the scope of the present disclosure as well.

The chassis 302 may also house a plurality of computing device components 306*a*, 306*b*, and up to 306*c*, each of which may be coupled to the computing device engine 304 (e.g., via a coupling between the computing device components 306*a*-306*c* and the processing system), and each of which may be provided by any of a variety of computing device components that would be apparent to one of skill in the art in possession of the present disclosure. For example, many of the embodiments discussed below describe the computing device components 306*a*-306*c* as storage devices such as Non-Volatile Memory express (NVMe) Solid State Drive (SSD) storage devices that have been provided with a storage device compute subsystem that is configured to perform storage device compute operations that are separate from the host compute operations that may be performed by the computing device engine 304.

However, while described as storage devices in many of the specific examples provided below, one of skill in the art in possession of the present disclosure will appreciate how the computing device components 306*a*-306*c* may be provided by any other computing device component (e.g., memory subsystems, networking subsystems, fan subsystems, power subsystems, Graphics Processing Unit (GPU) subsystems, etc.) that has been configured to perform component compute operations that are separate from the host compute operations and that provide for the component health determination and reporting operations described below. Furthermore, while the computing device components that perform the component health determination and reporting operations described below are illustrated and discussed as being included in a computing device, one of skill in the art in possession of the present disclosure will appreciate that the computing device components of the present disclosure may be provided outside a computing device (e.g., as standalone components such as IoT devices, external storage devices, and/or other components known in the art) while remaining within the scope of the present disclosure as well.

The chassis 302 may also house a communication system 308 that is coupled to the computing device engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. However, while a specific computing device 300 has been illustrated and described, one of skill in the art in possession of the present disclosure will recognize that computing devices (or other devices operating according to the teachings of the present disclosure in a manner similar to that described below for the computing device 300) may include a variety of components and/or component configurations for providing conventional computing device functionality, as well as the functionality discussed below, while remaining within the scope of the present disclosure as well.

Figure 4:
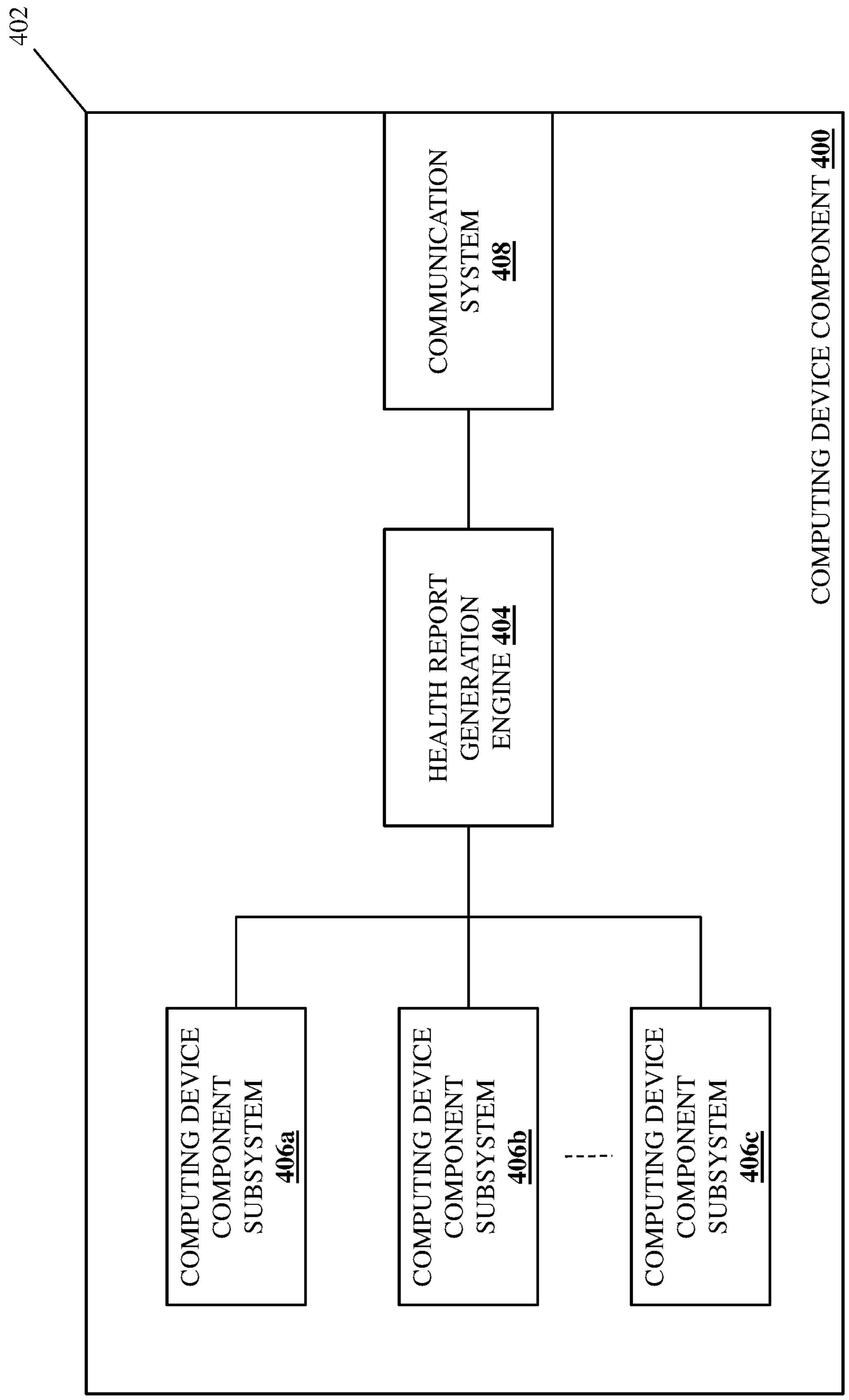
FIG. 4 is a schematic view illustrating an embodiment of a computing device component that may be included in the computing device of FIG. 3 and that may provide the component health determination and reporting system of the present disclosure.

Referring now to FIG. 4, an embodiment of a computing device component 400 is illustrated that may provide any of the computing device components 306*a*-306*c* discussed above with reference to FIG. 3. As such, the computing device component 400 may be provided in the IHS 100 discussed above with reference to FIG. 1 and/or may include some or all of the components of the IHS 100, and in specific examples may be provided by storage devices, memory subsystems, networking subsystems, fan subsystems, power subsystems, Graphics Processing Unit (GPU) subsystems, and/or any other computing device components that would be apparent to one of skill in the art in possession of the present disclosure. Furthermore, while illustrated and discussed as being provided by particular computing device components included in a computing device, one of skill in the art in possession of the present disclosure will recognize that the functionality of the computing device component 400 discussed below may be provided by other components (included in computing devices or provided without computing devices) that are configured to operate similarly as the computing device component 400 discussed below.

In the illustrated embodiment, the computing device component 400 includes a chassis 402 that houses the sub-components of the computing device component 400, only some of which are illustrated and discussed below. For example, the chassis 402 may house a component processing system (not illustrated, but which may be similar to the processor 102 discussed above with reference to FIG. 1) and a component memory system (not illustrated, but which may similar to the memory 114 discussed above with reference to FIG. 1) that is coupled to the component processing system and that includes instructions that, when executed by the component processing system, cause the component processing system to provide a health report generation engine 404 that is configured to perform the functionality of the health report generation engines and/or computing device components discussed below. In a specific example, the health report generation engine 404 may be provided by a microservice in the computing device component 400, although other techniques for providing the health report generation engine 404 will fall within the scope of the present disclosure as well.

Continuing with the specific example provided above, the computing device component 400 may be provided by a storage device such as an NVMe SSD storage device that is provided with a storage device processing system and a storage device memory system that is coupled to the storage device processing system and that includes instructions that, when executed by the storage device processing system, cause the storage device processing system to perform storage device compute operations that are separate from host device compute operations provided by a computing device in which it is located, and that are utilized to provide the health report generation engine 404 described below. However, as also discussed below, the computing device component 400 may instead be provided by other computing device components that have been configured to perform component compute operations that are separate from host device compute operations provided by a computing device in which it is located, and that are utilized to provide the health report generation engine 404 described below, while remaining within the scope of the present disclosure as well. Furthermore, as discussed above, non-illustrated embodiments of the present disclosure may provide the computing device component 400 and its functionality described below without the computing device described herein.

The chassis 402 may also house a plurality of computing device component subsystems 406*a*, 406*b*, and up to 406*c*, each of which may be coupled to the health report generation engine 404 (e.g., via a coupling between the computing device component subsystems 406*a*-406*c* and the component processing system). In an embodiment, each of the computing device component subsystems 406*a*-406*c* may be provided by any of a variety of computing device hardware and/or software that one of skill in the art in possession of the present disclosure will appreciate may be included in a computing device component. Continuing with the examples discussed above that describe the computing device component 400 as a storage device such as an NVMe SSD storage device, the computing device component subsystems 406*a*-406*c* may be provided by storage device subsystems that may include a NAND storage subsystem (e.g., an array of NAND storage elements), storage device sensors (e.g., temperature sensors, bandwidth sensors, and/or other sensors that would be apparent to one of skill in the art art in possession of the present disclosure), storage device firmware (e.g., an SSD controller), storage device applications (e.g., garbage collection applications, wear leveling applications, error identification and/or correction applications, and/or other storage device applications that would be apparent to one of skill in the art in possession of the present disclosure), and/or any other storage device component subsystems that one of skill in the art in possession of the present disclosure would recognize as capable of generating and providing the telemetry data discussed below. However, while a storage device with particular storage device subsystems has been described, one of skill in the art in possession of the present disclosure will appreciate how different computing device components may include different computing device component subsystems that will fall within the scope of the present disclosure as well.

The chassis 402 may also house a communication system 408 that is coupled to the health report generation engine 404 (e.g., via a coupling between the communication system 408 and the component processing system) and that may be provided by any of a variety of communication sub-components that would be apparent to one of skill in the art in possession of the present disclosure. However, while a specific computing device component 400 has been illustrated and described, one of skill in the art in possession of the present disclosure will recognize that computing device components (or other components operating according to the teachings of the present disclosure in a manner similar to that described below for the computing device component 400) may include a variety of sub-component and/or sub-component configurations for providing conventional computing device component functionality, as well as the functionality discussed below, while remaining within the scope of the present disclosure as well.

Figure 5:
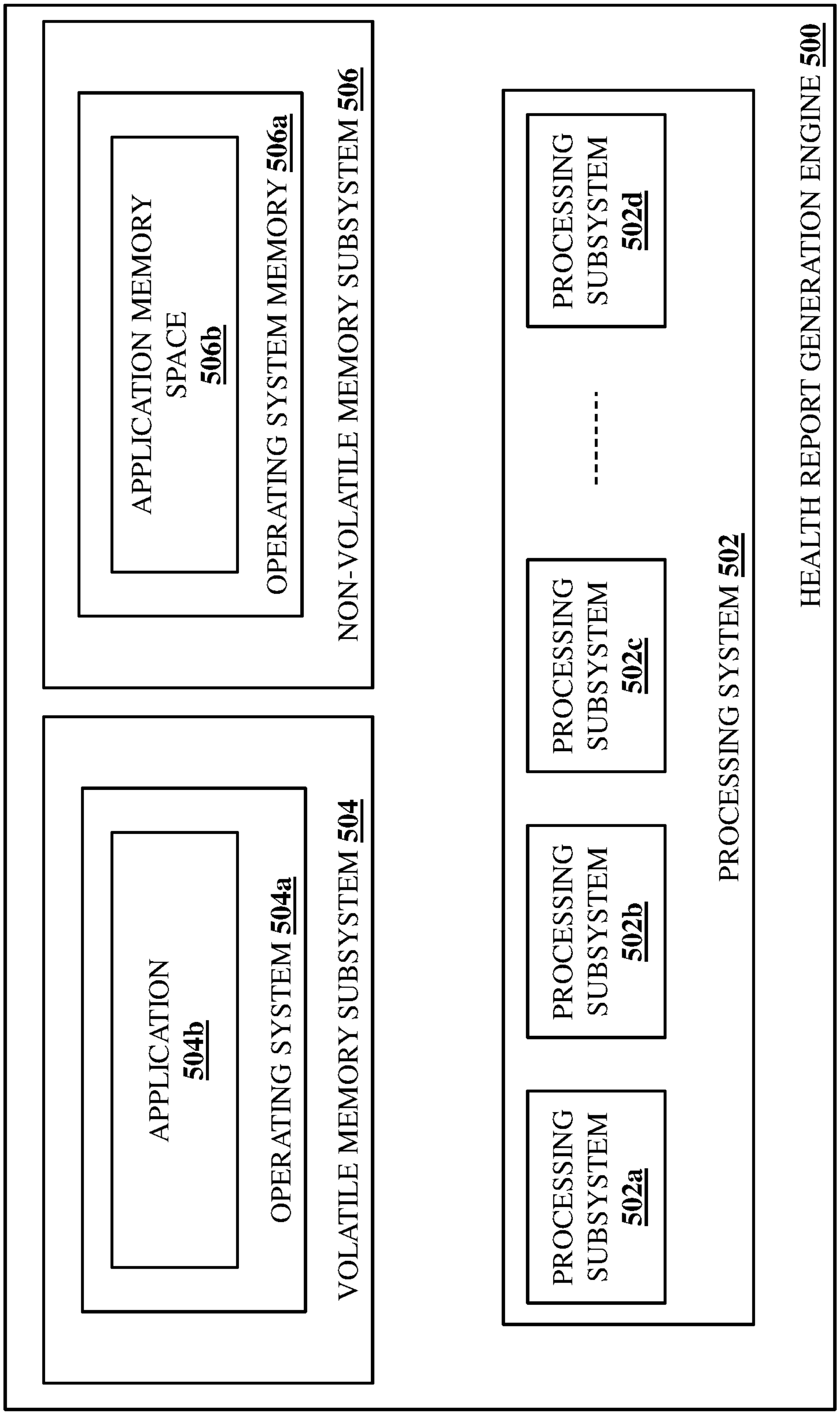
FIG. 5 is a schematic view illustrating an embodiment of a health report generation engine that may be included in the computing device component of FIG. 4 and that may provide the component health determination and reporting system of the present disclosure.

Referring now to FIG. 5, an embodiment of a health report generation engine 500 is illustrated that may provide the health report generation engine 404 discussed above with reference to FIG. 4. As described above, the health report generation engine 500 may be provided by a component processing system that is included in the computing device component 400, and that component processing system may be provided as part of an Integrated Circuit (IC) that is illustrated in FIG. 5 as including a processing system 502 having a plurality of processing subsystems 502*a*, 502*b*, 502*c*, and up to 502*d*. For example, the processing system 502 may be provided by a Central Processing Unit (CPU) in the IC, with the processing subsystems 502*a*-502*d* provided by cores of the CPU. However, while described as being provided by a particular processing system having particular processing subsystems, one of skill in the art in possession of the present disclosure will appreciate how other processing systems will fall within the scope of the present disclosure as well.

As also described above, the health report generation engine 500 may be provided by a component memory system that is included in the computing device component 400, and that component memory system may be provided as part of the IC discussed above and is illustrated in FIG. 5 as including a volatile memory subsystem 504 (e.g., Random Access Memory (RAM)) and a non-volatile memory subsystem 506. However, while described as being provided by a particular memory system having particular memory subsystems, one of skill in the art in possession of the present disclosure will appreciate how the memory system providing the health report generate engine 500 may include a variety of memory components that will fall within the scope of the present disclosure as well. As illustrated in FIG. 5 and discussed in further detail below, the processing system 502 may utilize the volatile memory subsystem 504 to provide an operating system 504*a* that may include, for example, a LINUX® operating system kernel that may be configured with only the modules required for the operation of the IC discussed above and any associated microservices, and/or any other operating systems/operating system components that one of skill in the art in possession of the present disclosure will appreciate may provide for the functionality described below. For example, the operating system 504*a* may be provided via a read-only "blob" or other image that may be loaded during boot or other initialization operations into the volatile memory subsystem 504, with a volatile file system (e.g., a compressed Read-Only Memory (ROM)/RAM file system) for the operating system 504*a* also created in the volatile memory subsystem 504 from the read-only "blob"/image.

Furthermore, as also illustrated in FIG. 5 and discussed in further detail below, the processing system 502 may utilize the operating system 504*a* to provide an application 504*b* that may be configured to perform the telemetry data receiving operations, telemetry data compaction operations, compacted telemetry data inference operations, and/or other health report generation operations discussed below. As will be appreciated by one of skill in the art in possession of the present disclosure, the application 504*b* may be provided in the read-only "blob"/image described below and/or otherwise provided in the operating system 504*a* using a variety of techniques that would be apparent to one of skill in the art in possession of the present disclosure.

As also illustrated in FIG. 5 and discussed in further detail below, the non-volatile memory subsystem 506 may be configured to provide an operating system memory 506*a* via allocation of a portion of the non-volatile memory subsystem 506 for the operating system 504*a*, while the operating system memory 506*a* may be configured to provide an application memory space 506*b* via allocation of a portion of the operating system memory 506*a* for the application 504*b*. In an embodiment, the application memory space 506*b* may be configured to store the compacted telemetry data, inference operation parameters, and/or other data discussed below. However, while a specific health report generation engine 500 is illustrated and described, one of skill in the art in possession of the present disclosure will appreciate how the health report generation engine of the present disclosure and its associated functionality described herein may be provided in other manners while remaining within the scope of the present disclosure as well.

Figure 6:
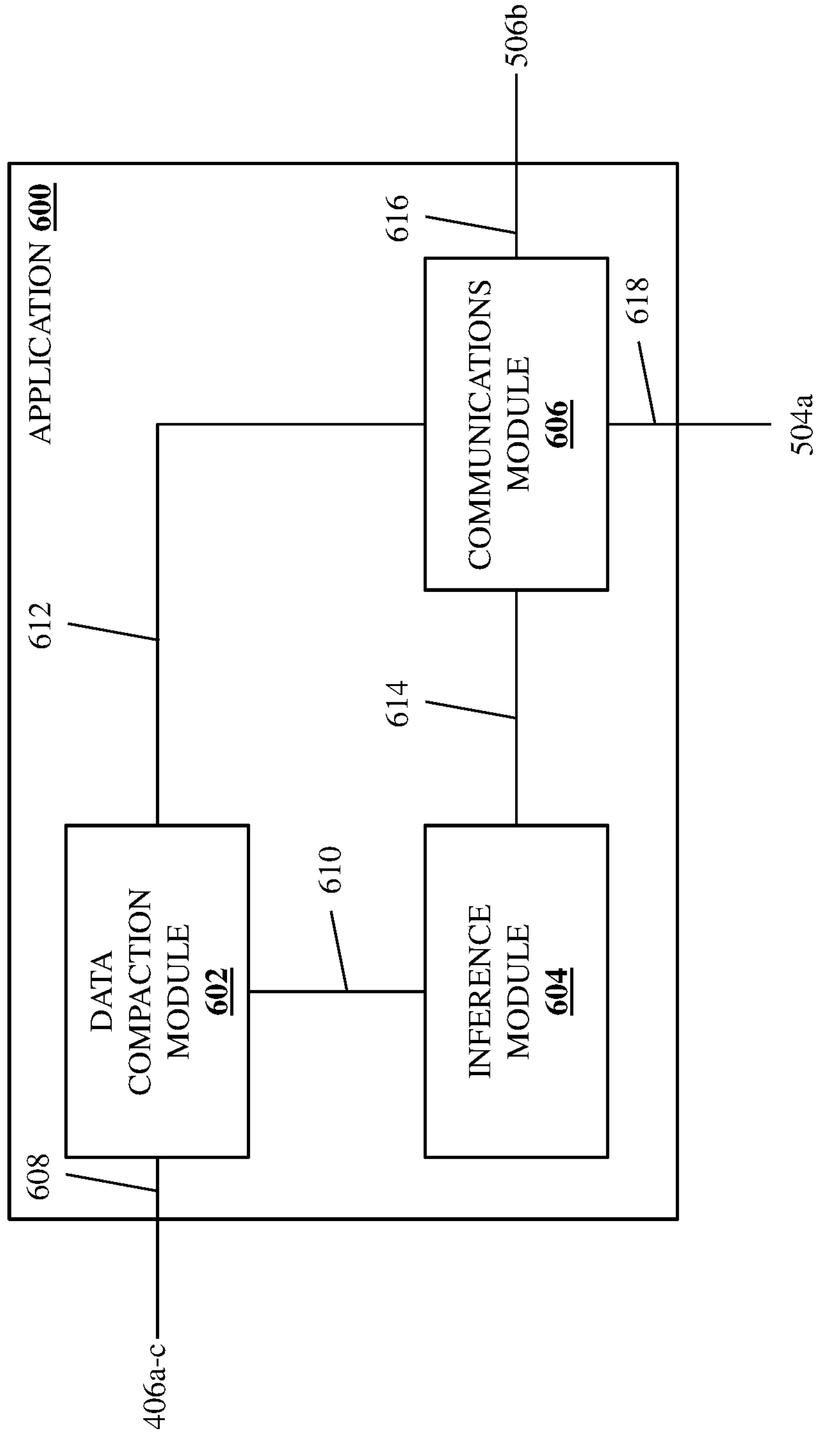
FIG. 6 is a schematic view illustrating an embodiment of an application that may be provided by the health report generation engine of FIG. 5 and that may provide the component health determination and reporting system of the present disclosure.

Referring now to FIG. 6, an embodiment of an application 600 is illustrated that may provide the application 504*b* discussed above with reference to FIG. 5. In the illustrated embodiment, the application includes a data compaction module 602 that may be configured to perform the data compaction operations described below, an inference module 604 that may be configured to perform the inference operations discussed below, and a communications module 606 that may be configured to perform the communications operations discussed below. As discussed above and in further detail below, the computing device 202*a*-202*c*/300 and computing device component 306*a*-306*c*/400 may be provided in an "edge" environment that constrains their processing resources to particular tasks, and thus the inference module 604 may be provided via inference module code that is custom written (e.g., using a relatively low-level programming language such as C++) and relatively highly optimized for the computing device component 400 to perform the "forward pass" inference operations discussed below.

Furthermore, the data compaction module 602 may be coupled to the computing device component subsystems 406*a*-406*c* via a communications interface 608 that may be provided by, for example, an Application Programming Interface (API) integration (e.g., with the API of a telemetry bus coupled to the computing device component subsystems 406*a*-406*c*) and/or other communications interface components that would be apparent to one of skill in the art in possession of the present disclosure. The data compaction module 602 may also be coupled to the inference module 604 and the communications module 606 via communications interfaces 610 and 612, respectively, that may be provided by, for example, respective API integrations and/or other communications interface components that would be apparent to one of skill in the art in possession of the present disclosure.

The inference module 604 may also be coupled to the communications module 606 via a communications interface 614 that may be provided by, for example, an API integration and/or other communications interface components that would be apparent to one of skill in the art in possession of the present disclosure. The communications module 606 may be coupled to the application memory space 506*b* via a communications interface 616 that may be provided by, for example, an API integration and/or other communications interface components that would be apparent to one of skill in the art in possession of the present disclosure. The communications module 606 may also be coupled to the operating system 504*a* via a communications interface 618 that may be provided by, for example, an API integration and/or other communications interface components that would be apparent to one of skill in the art in possession of the present disclosure. In a specific example, the data compaction module 602, the inference module 604, the communication module 606, and the communications interfaces 608, 610, 612, 614, 616, and 618 may be provided in the compressed, read-only ROM/RAM file system image discussed above, and may only be updatable via an operating system update for the IC that provides the health report generation engine 404/500 in order to, for example, ensure relatively robust and fast boot/initialization operation times. However, while a specific application has been illustrated and described, one of skill in the art in possession of the present disclosure will appreciate how the application of the present disclosure and its associated functionality described herein may be provided in other manners while remaining within the scope of the present disclosure as well.

Figure 7:
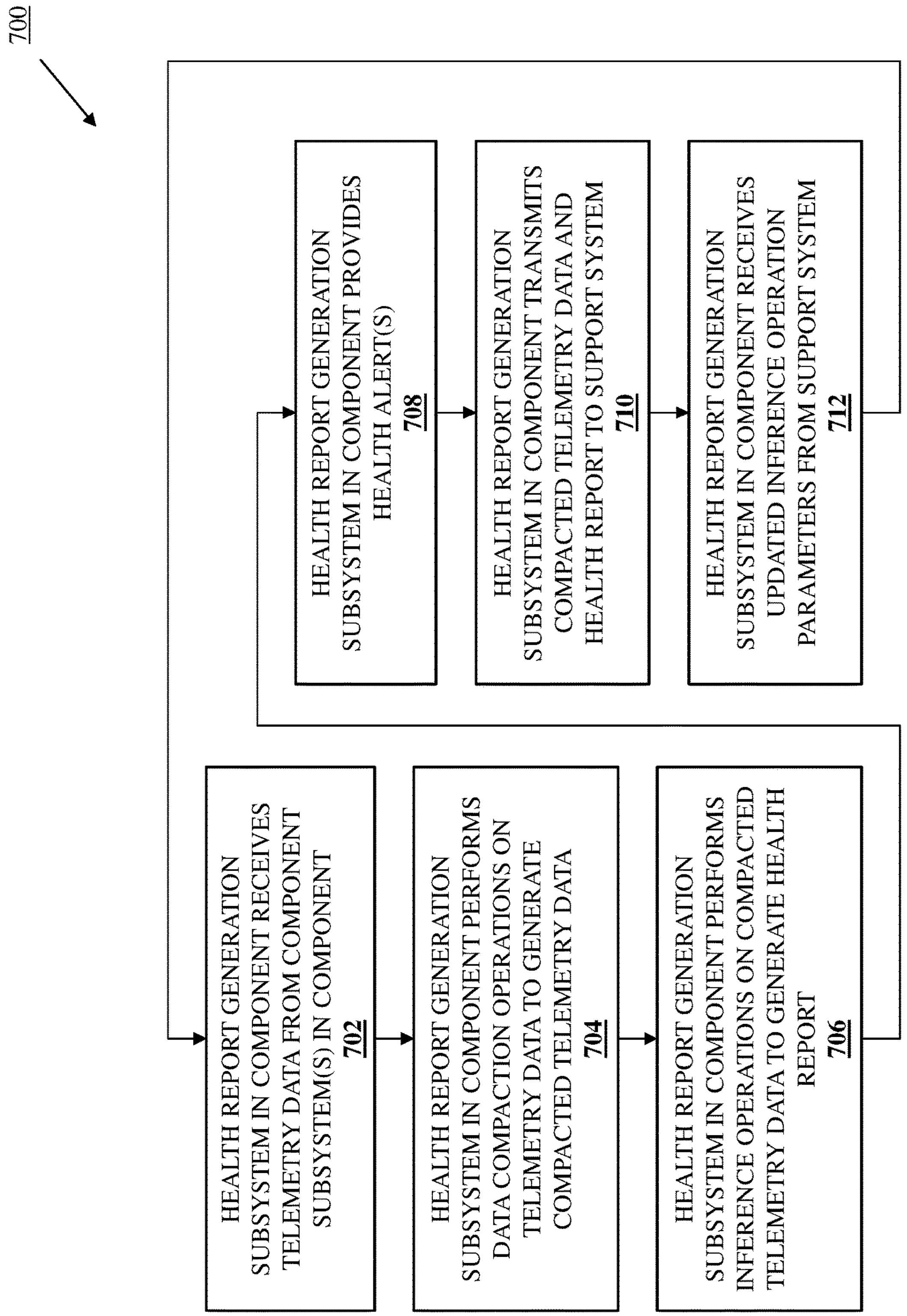
FIG. 7 is a flow chart illustrating an embodiment of a method for determining and reporting component health.

Referring now to FIG. 7, an embodiment of a method 700 for determining and reporting component health is illustrated. As discussed below, the systems and methods of the present disclosure provide components that collect telemetry data from their component subsystems, compact that telemetry data to generate compacted telemetry data, and perform inference operations on that compacted telemetry data to generate their own health reports, while provisioning those health reports to the computing device in which they are located. For example, the component health determination and reporting system of the present disclosure may include a computing device having a computing device component. The computing device component includes computing device component subsystem(s) coupled to a health report generation subsystem. The health report generation subsystem receives telemetry data from each of the computing device component subsystem(s), performs data compaction operations on the telemetry data to generate compacted telemetry data, performs inference operations on the compacted telemetry data to generate a health report for the computing device component, and provides the health report to the computing device. As such, the issues with conventional computing device health determination and reporting systems discussed above are remedied.

In some embodiments of the present disclosure, the support system 206 discussed above with reference to FIG. 2 may operate to perform "deep learning" training operations on an inference model in order to generate inference operation parameters (e.g., deep learning model weights and/or other parameters that would be apparent to one of skill in the art in possession of the present disclosure) that may be utilized by the inference modules described below in order to perform the inference operations discussed below. As such, inference operation parameters generated by the support system 206 may be provided to the computing device components 306*a*-306*c*/400 and stored with the health report generation engine 404/500 (e.g., in the application memory space 506*b* included in the operating system memory 506*a* of the non-volatile memory subsystem 506 in the embodiments described below). As described herein, the data compaction module 602 in the application 504*b*/600 provided by the health report generation engine 404/500 of the computing device component 400 may operate to convert telemetry data received from the computing device component subsystems 406*a*-406*b* to compacted telemetry data, and the inference module 604 in that application 504*b*/600 may operate to perform inference operations on that compacted telemetry data that utilize the inference operation parameters discussed above in order to generate a health report for the computing device component 400.

As will be appreciated by one of skill in the art in possession of the present disclosure, inference operation parameters may be generated by the support system 206 and provided to the computing device components for use in generating the health reports via the inference operations discussed above, the compacted telemetry data and health reports generated by those computing device components may then be provided to the support system 206 for use in the deep learning training operations on the inference model, and this process may iterate. Thus, as the computing device components operate over time and experience health issues, the deep learning training operations on the inference model discussed above may identify relationship between compacted telemetry data, health reports, and health issues actually experienced by computing device components, with updated inference operation parameters determined based on those identified relationships and provided to the computing device components for use in subsequent inference operations. One of skill in the art in possession of the present disclosure will appreciate how this repeating of this process will increase accuracy of the health reports generated by the inference module 604 over time. As such, one of skill in the art in possession of the present disclosure will appreciate that the method 700 described below may be performed any time during the deep leaning training operations on the inference model described above.

Figure 8A:
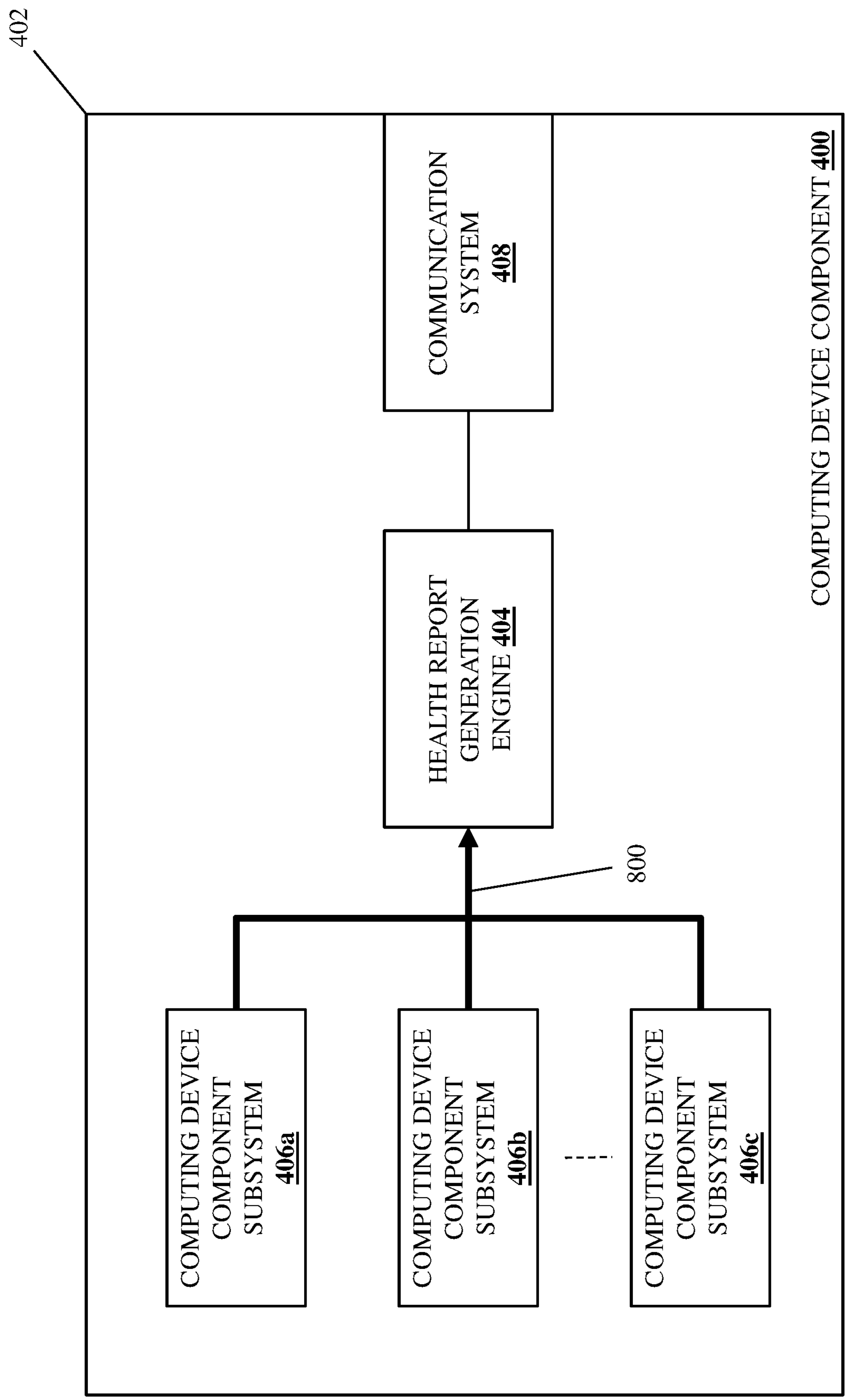
FIG. 8A is a schematic view illustrating an embodiment of the computing device component of FIG. 4 operating during the method of FIG. 7.
Figure 8B:
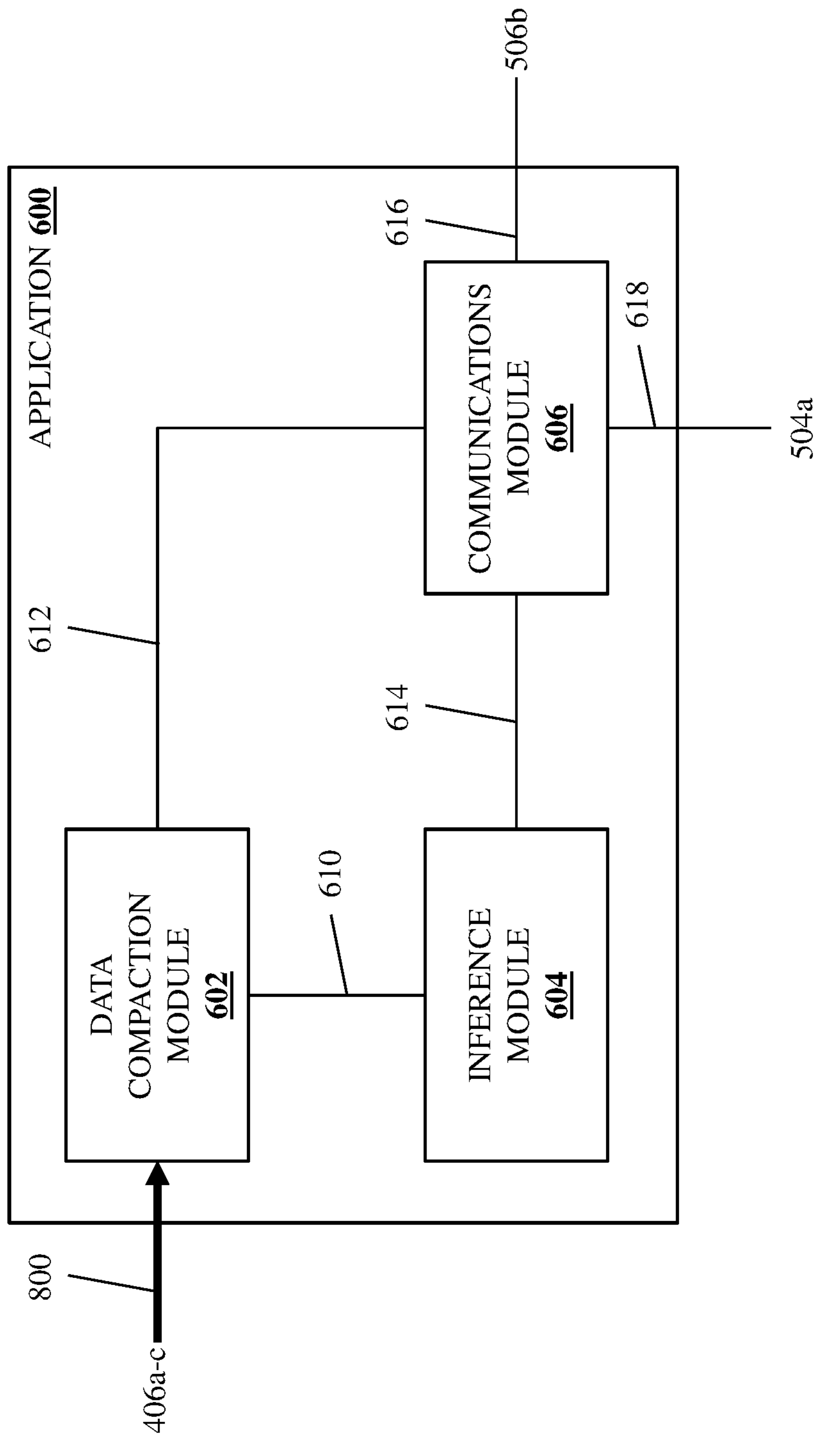
FIG. 8B is a schematic view illustrating an embodiment of the application of FIG. 6 operating during the method of FIG. 7.

The method 700 begins at block 702 where a health report generation subsystem in a component receives telemetry data from one or more component subsystems in the component. With reference to FIG. 8A, in an embodiment of block 702, the health report generation engine 304 in the computing device component 400 may perform telemetry data receiving operations 800 that may include receiving telemetry data from one or more of the computing device component subsystems 406$a$-406$c$. For example, with reference to FIG. 8B, the telemetry data receiving operations 800 may include the data compaction module 602 in the application 504$b$/600 provided by the health report generation engine 404/500 receiving the telemetry data from one or more of the computing device component subsystems 406$a$-406$c$ via the communications interface 608 such as the API integration with the API of a telemetry bus coupled to the computing device component subsystems 406$a$-406$c$ as discussed above. In a specific embodiment, the telemetry data received by the health report generation engine 304 in the computing device component 400 may be provided in telemetry data streams generated and transmitted by the computing device component subsystems 406$a$-406$c$, although other techniques for providing telemetry data will fall within the scope of the present disclosure as well.

Continuing with the embodiment discussed above in which the computing device component 400 is a storage device, the telemetry data received at block 702 may include telemetry data generated and transmitted by a NAND storage subsystem (e.g., an array of NAND storage elements), storage device sensors (e.g., temperature sensors, bandwidth sensors, and/or other sensors that would be apparent to one of skill in the art in possession of the present disclosure), storage device firmware (e.g., an SSD controller), storage device applications (e.g., garbage collection applications, wear leveling applications, error identification and/or correction applications, and/or other storage device applications that would be apparent to one of skill in the art in possession of the present disclosure), and/or any other storage device component subsystems that one of skill in the art in possession of the present disclosure would recognize as generating and providing telemetry data. However, while storage-device-specific telemetry data is described in detail herein, one of skill in the art in possession of the present disclosure will appreciate how other computing devices may provide other telemetry data while remaining within the scope of the present disclosure as well.

The method 700 then proceeds to block 704 where the health report generation subsystem in the component performs data compaction operations on the telemetry data to generate compacted telemetry data. In an embodiment, at block 704, the health report generation engine 304 in the computing device component 400 may perform data compaction operations on the telemetry data received at block 702 in order to generate compacted telemetry data. For example, at block 704, the data compaction module 602 in the application 504$b$/600 provided by the health report generation engine 404/500 may perform the data compaction operations on the telemetry data received at block 702 in order to generate the compacted telemetry data. As will be appreciated by one of skill in the art in possession of the present disclosure, data compaction operations may be configured to reduce the number of data elements, bandwidth, cost, and/or time associated with the generation, transmission, and/or storage of data without an associated loss of information of interest in that telemetry data via the elimination of redundant data, the removal of irrelevant data, and/or the use of particular coding techniques. Some specific examples of data compaction operations utilize fixed-tolerance bands, variable-tolerance bands, slope-key points, sample changes, curve patterns, curve fitting, variable-precision coding, frequency analysis, probability analysis, and data embeddings, although one of skill in the art in possession of the present disclosure will appreciate that data compaction operations utilizing other data compaction techniques will fall within the scope of the present disclosure as well.

To provide a specific, simplified example of data compaction operations, assume a time series of telemetry data received from n computing device component subsystems over t time steps is provided by the following telemetry data matrix:

$$\begin{matrix} X_{11}, X_{12}, \ldots X_{1n} \\ X_{21}, X_{22}, \ldots X_{2n} \\ \ldots \\ X_{t1}, X_{t2}, \ldots X_{tn} \end{matrix}$$

Using data compaction operations similar to those discussed above, the information in the telemetry data matrix above may be represented using the following compacted telemetry data matrix of dimensions (m, n), where m is the number of parameters required for the particular data compaction technique being utilized:

$$\begin{matrix} \varphi_1, \varphi_2, \ldots \varphi_n \\ \omega_1, \omega_2, \ldots \omega_n \\ \ldots \\ \alpha_1, \alpha_2, \ldots \alpha_n \end{matrix}$$

To provide a greatly simplified example, the element $\varphi_1$ in the compacted telemetry data matrix may provide a mean of the time-series data $X_{11}, X_{21}, \ldots X_{t1}$ in the telemetry data matrix, the element $\omega_1$ in the compacted telemetry data matrix may provide a standard deviation of the time-series data $X_{11}, X_{21}, \ldots X_{t1}$ in the telemetry data matrix, the element $\alpha_1$ in the compacted telemetry data matrix may identify anomalies in the time-series data $X_{11}, X_{21}, \ldots X_{t1}$ in the telemetry data matrix; the element $\varphi_2$ in the compacted telemetry data matrix may provide a mean of the time-series data $X_{12}, X_{22}, \ldots X_{t2}$ in the telemetry data matrix, the element $\omega_2$ in the compacted telemetry data matrix may provide a standard deviation of the time-series data $X_{12}, X_{22}, \ldots X_{t2}$ in the telemetry data matrix, the element $\alpha_2$ in the compacted telemetry data matrix may identify anomalies in the time-series data $X_{12}, X_{22}, \ldots X_{t2}$ in the telemetry data matrix; and so on. As such, one of skill in the art in possession of the present disclosure will appreciate how data compaction techniques like those described above may generate compacted telemetry data that eliminates noise, "fluke" events, and/or other anomalies that are present in the telemetry data, thus preventing such anomalies from effecting the inference operations discussed below.

As will be appreciated by one of skill in the art in possession of the present disclosure, the compacted telemetry data matrix may be considerably smaller than the telemetry data matrix, as m may be much smaller than t, and the smaller size of the compacted telemetry data matrix requires less storage space and results in lower latencies when transferred via the network, while also preserving information of interest in the telemetry data matrix. Mathematically, these data compaction operations may be represented by the following equation:

$$X'_{(m,n)} = \delta(X_{(t,n)}), m << t$$

Where X is the telemetry data matrix and X' is the corresponding compacted telemetry data matrix, and δ is a mathematical representation of the data compaction method. As will be appreciated by one of skill in the art in possession of the present disclosure, the data compaction method utilized in the present disclosure may be considered a hyper-parameter and may be selected based on the performance of different data compaction methods in particular use cases.

As discussed above, in some embodiments the health report generation engine 304 in the computing device component 400 may receive the telemetry data from the computing device component subsystems 406*a*-406*c* in telemetry data streams and, in such embodiments, the data compaction module 602 in the application 504*b*/600 provided by the health report generation engine 404/500 may perform the data compaction operations discussed above on that telemetry data stream, with the resulting compacted telemetry data having a size that may be transferred with relative low amounts of network bandwidth, stored with relatively low amounts of storage, and/or providing other benefits that would be apparent to one of skill in the art in possession of the present disclosure. As such, in some examples, the telemetry data may have the data compaction operations performed on it as it is continuously streamed to the data compaction module 602 to generate the compacted telemetry data, which one of skill in the art in possession of the present disclosure will recognize allows for relatively high frequency telemetry data collection without the associated network transfer latencies and required storage resources introduced in conventional computing device health determination and reporting systems.

As will be appreciated by one of skill in the art in possession of the present disclosure, the data compaction operations on the telemetry data streams discussed above may allow the telemetry data to be discarded by the application 504*b*/600 provided by the health report generation engine 404/500 as the corresponding compacted telemetry data is generated (e.g., the compacted telemetry data may be continuously modified/updated using the telemetry data provided in the telemetry data stream, with that telemetry data discarded after use in modifying/updating the compacted telemetry data stream via the data compaction operations), which allows the information of interest in the telemetry data to be captured without the need to store that telemetry data that would otherwise require relatively large files/storage for the health report generation engine 404/500. For example, such telemetry data stream compaction operations may be represented by the following equation:

$$X'_t=\delta(X_t,X'_{t-1})$$

Wherein $X'_t$ and $X_t$ are compacted telemetry data and a telemetry data stream at time t, respectively, $X'_{t-1}$ is the compacted telemetry data at time t−1, and δ is mathematical representation of the data compaction method.

Figure 9:
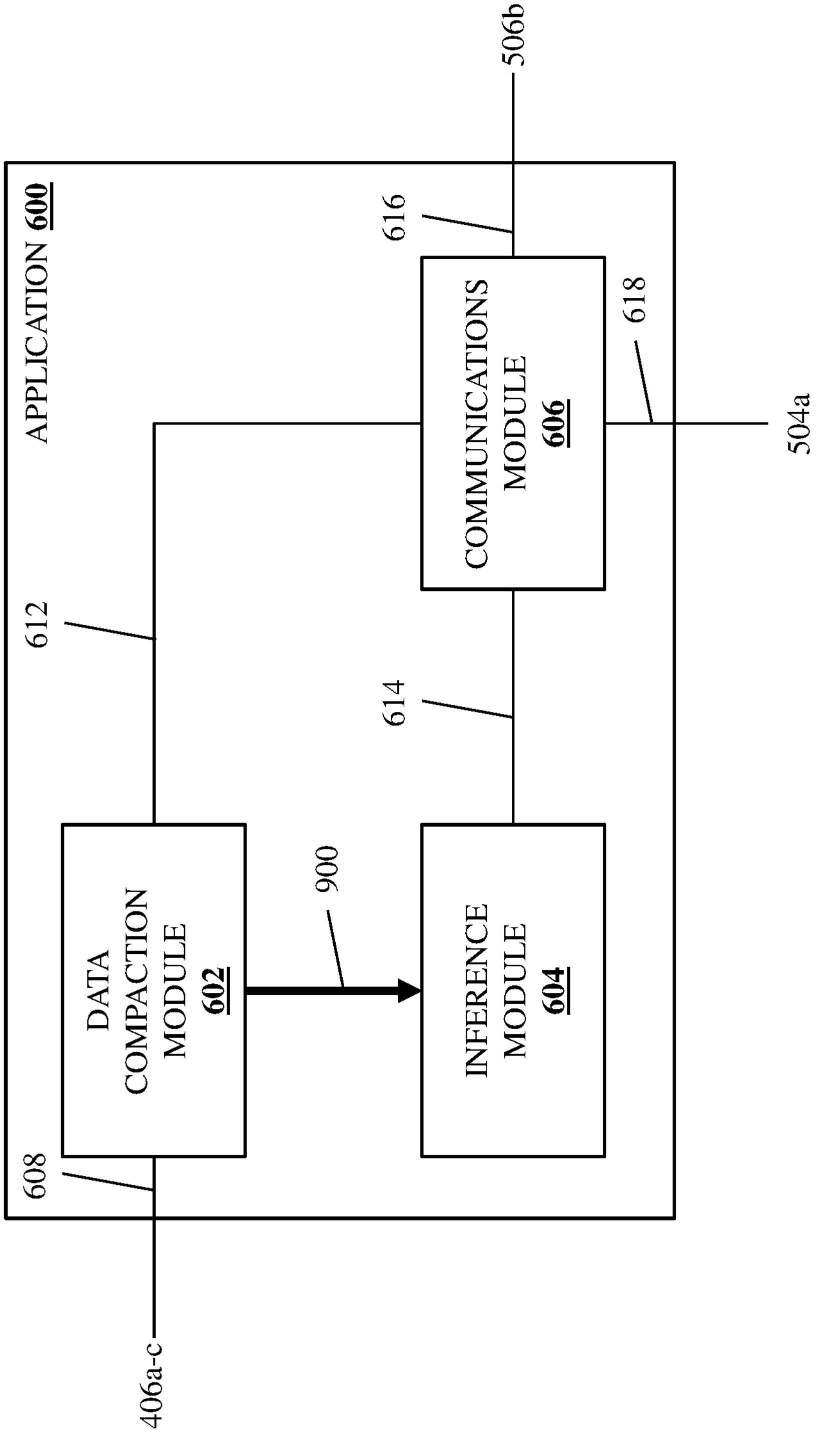
FIG. 9 is a schematic view illustrating an embodiment of the application of FIG. 6 operating during the method of FIG. 7.

The method 700 then proceeds to block 706 where the health report generation subsystem in the component performs inference operations on the compacted telemetry data to generate a health report. In an embodiment, following the data compaction operations at block 704, the health report generation engine 404 in the computing device component 400 may perform inference operations on the compacted telemetry data to generate a health report. For example, with reference to FIG. 9 and in an embodiment of block 706, the data compaction module 602 in the application 504*b*/600 provided by the health report generation engine 404/500 may perform compacted telemetry data provisioning operations 900 that may include providing the compacted telemetry data to the inference module 604 in the application 504*b*/600 provided by the health report generation engine 404/500 via the communications interface 610 provided by the API integration as discussed above. In response to receiving the compacted telemetry data, the inference module 604 may perform inference operations on that compacted telemetry data.

Figure 10A:
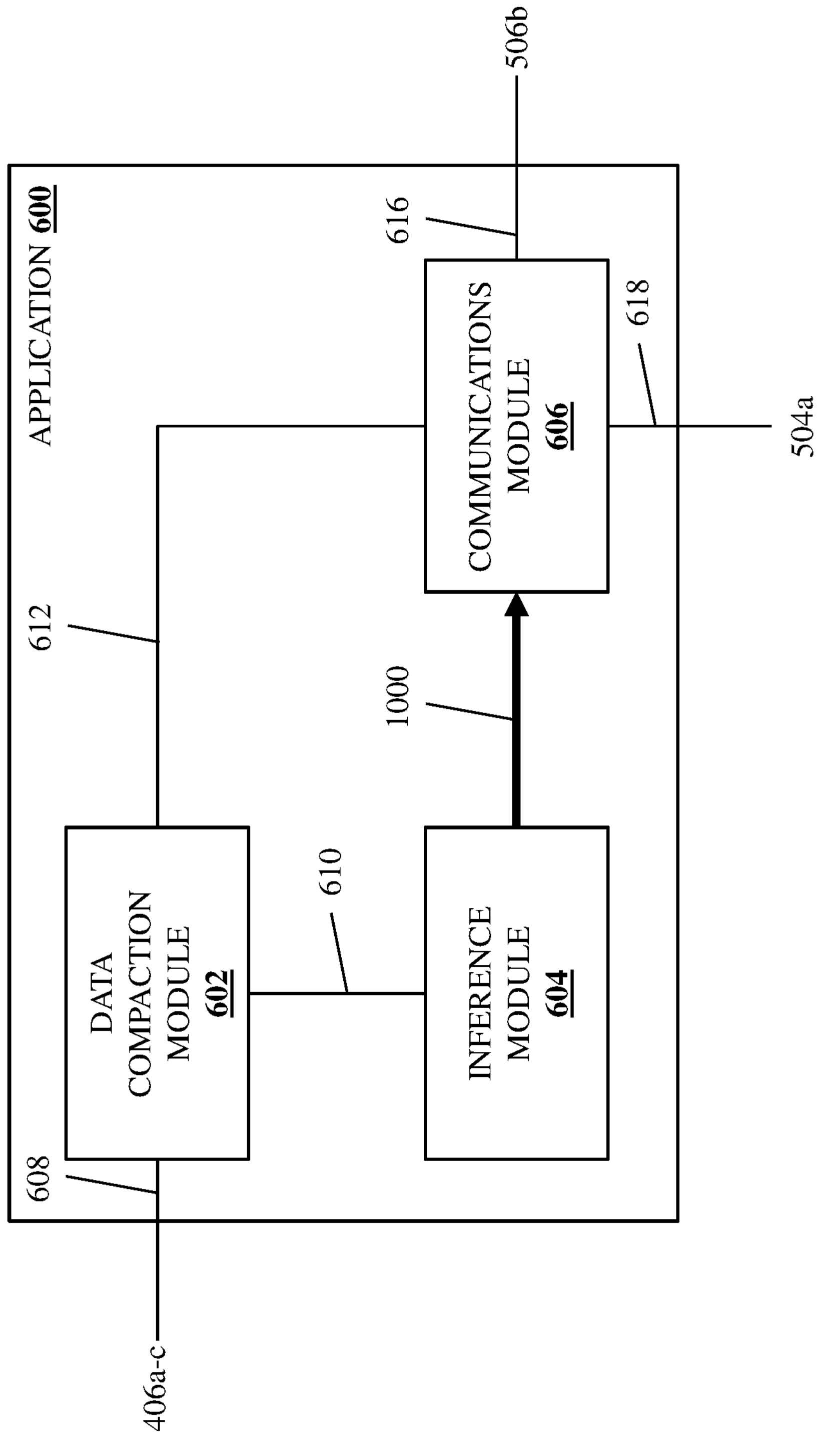
FIG. 10A is a schematic view illustrating an embodiment of the application of FIG. 6 operating during the method of FIG. 7.
Figure 10B:
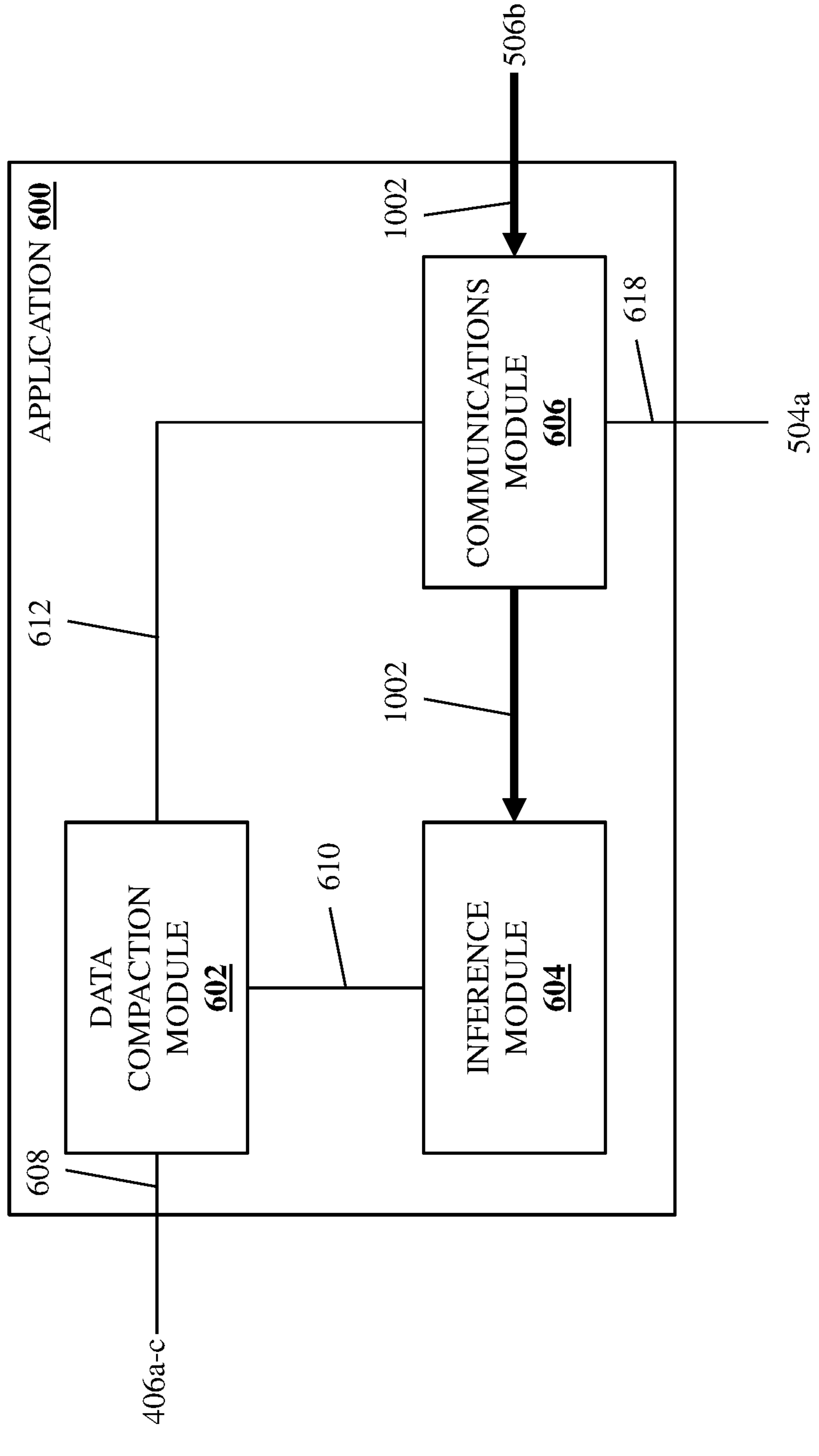
FIG. 10B is a schematic view illustrating an embodiment of the application of FIG. 6 operating during the method of FIG. 7.

With reference to FIGS. 10A and 10B, in response to receiving the compacted telemetry data, the inference module 604 may perform inference operation parameter request operations 1000 that may include transmitting a request for inference operation parameters to the communications module 606 in the application 504*b*/600 provided by the health report generation engine 404/500 via the communications interface 614 provided by the API integration as discussed above. In response to receiving the request for inference operation parameters, the communications module 606 may perform inference operation parameter provisioning operations 1002 that may include retrieving inference operation parameters from the application memory space 506*b* in the operating system memory 506*a* of the non-volatile memory subsystem 506 via the communications interface 616 provided by the API integration as discussed above, and providing those inference operation parameters to the inference module 604 via the communications interface 614 provided by the API integration as discussed above.

As discussed above, the inference module 604 in the application 504*b*/600 provided by the health report generation engine 404/500 may utilize inference operation parameters generated via deep learning training on an inference model. As will be appreciated by one of skill in the art in possession of the present disclosure, such deep learning models may include a sequence of layers that may perform linear operations or element-wise transformations, and may provide a neural network model that can be expressed via the following composite function:

$$y'=\eta W(X)$$

where y' is an estimate of a target (y), η is a composite function with weight/parameters set W, and X is an input feature matrix.

One of skill in the art in possession of the present disclosure will recognize how such a neural network model may be initialized with random weights/parameters and, during the iterative training process discussed above, the optimal weights/parameters will then be learned through back propagation. In the component health determination and reporting system of the present disclosure, the majority of the computational load associated with the neural network model will be spent by the support system 206 during that iterative training process using large databases of compacted telemetry data provided by the computing device components 306*a*-306*c*, while the performance of the inference operations by the inference module 604 in the application 504*b*/600 provided by the health report generation engine 404/500 will be relatively light on the computational resources of the computing device components 400 (i.e., the inference/"forward pass" operations are a sequence of linear operations (O(n3)) for one data point and have a significantly smaller computational overhead relative to the deep learning training operations that generate the inference operation parameters used in those operations).

As discussed above, in some embodiments such as when the computing device 202*a*-202*c*/300 and computing device component 306*a*-306*c*/400 are provided in an "edge" environment that constrains their processing resources to particular tasks, the inference module 604 may be provided via inference module code that is custom written (e.g., using a relatively low-level programming language such as C++) and relatively highly optimized for the computing device component 400 to perform the "forward pass" inference operations discussed above. As discussed above, commercially available toolkits that are conventionally used to enable the models discussed above may be impractical for edge environments that require limited use of processing resources and storage resources in that edge environment. For example, the volatile memory subsystem 504 in the computing device component 400 may include a storage capacity in the tens of megabytes, and may be shared by multiple microservices and/or micro-applications, and thus a forward-pass-only inference module representing the deep learning/neural network model 11$w$ described above may perform the inference operations at block 706. As discussed above, that deep learning/neural network model 11$w$ may be a composite of multiple functions and may be written as follows:

$$\eta_W(X')=\eta_{kWk}(\eta_{k-1Wk-1}(\ldots(\eta_{1W1}(X))),W_k,W_{k-1},\ldots,W_1\in W$$

where $\eta k$, $\eta_{k-1}$, . . . , $\eta_1$ are the functions representing the k layers that compose the model raw, and $W_k$, $W_{k-1}$, . . . , $W_1$ are the weights/parameters associated with the k layers, jointly constituting the superset W.

As such, one of skill in the art in possession of the present disclosure will recognize how the inference module 604 provided by the inference module code discussed above may utilize the inference operations parameters described above (e.g., from their respective binary files stored in the non-volatile memory subsystem 506) along with the compacted telemetry data to generate a health report from the sequence of k functions/layers at block 706. In an embodiment, the health report generated at block 706 may include a current health status of any of the computing device component subsystems 406$a$-406$c$ (e.g., expressed as a health "percentage" for the computing device component subsystem(s), the computing device component(s), and/or the computing device between 1.0/100% (i.e., "new") and 0.0/0% (i.e., "failure")), health alerts for any of the computing device component subsystems 406$a$-406$c$ (e.g., based on health information for those computing device component subsystems 406$a$-406$c$ being outside a range or exceeding a threshold), and/or a variety of other health report information that would be apparent to one of skill in the art in possession of the present disclosure. However, while particular processes and techniques for generating the health report at block 706 have been described, one of skill in the art in possession of the present disclosure will appreciate how other processes and/or techniques for generating the health report of the present disclosure will fall within the scope of the present disclosure as well. As will be appreciated by one of skill in the art in possession of the present disclosure, the use of the compute resources in the computing device components 306$a$-306$c$/400 alleviates the need to utilize compute resources (e.g., the CPU) of the computing device 300.

Figure 11:
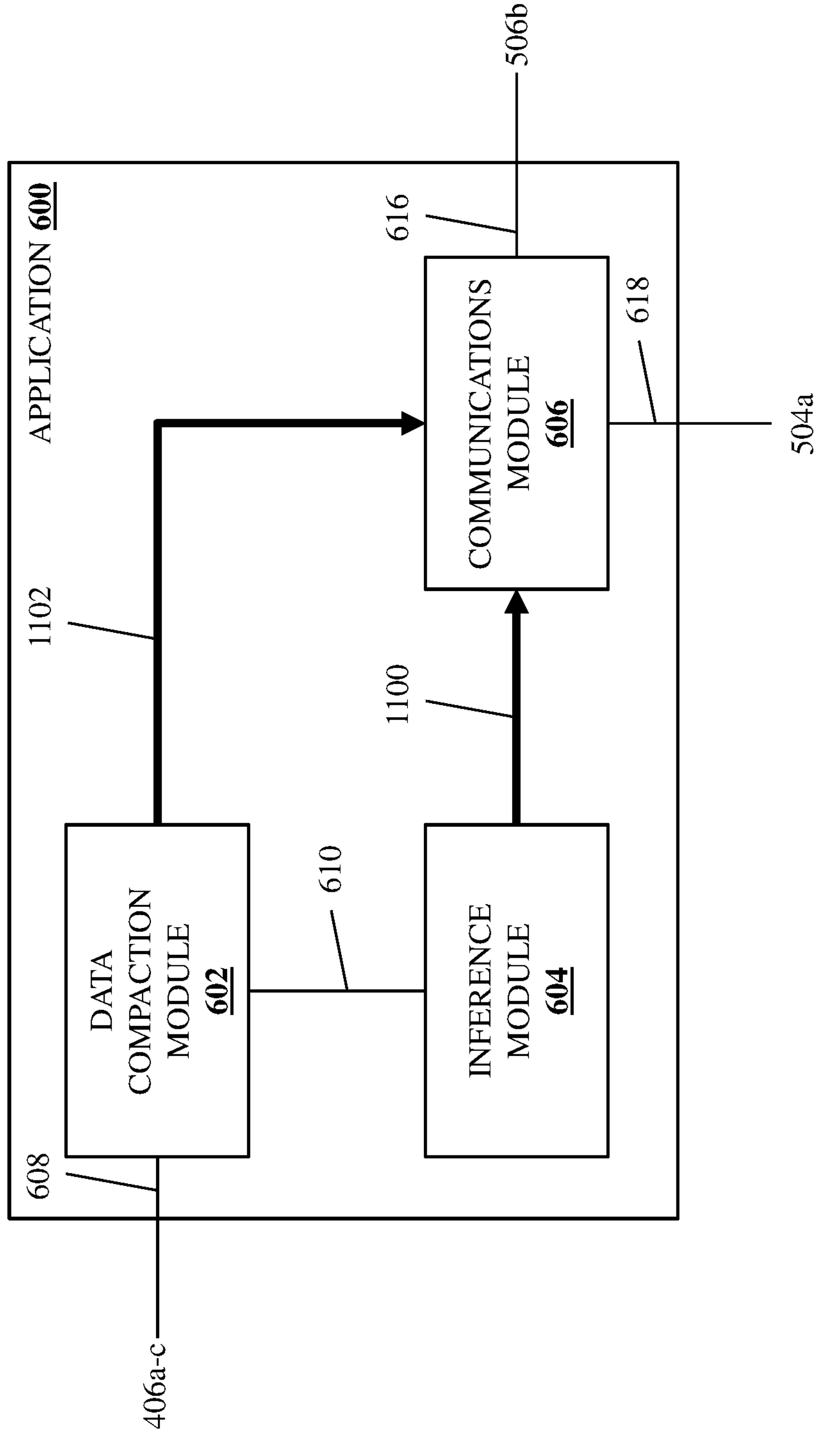
FIG. 11 is a schematic view illustrating an embodiment of the application of FIG. 6 operating during the method of FIG. 7.

With reference to FIG. 11, in some embodiments and following the generation of the health report, the inference module 604 in the application 504$b$/600 provided by the health report generation engine 404/500 may perform health report provisioning operations 1100 that may include transmitting the health report to the communications module 606 in the application 504$b$/600 provided by the health report generation engine 404/500 via the communications interface 614 provided by the API integration as discussed above. In addition, the data compaction module 602 in the application 504$b$/600 provided by the health report generation engine 404/500 may perform compact telemetry data provisioning operations 1102 that may include transmitting the compacted telemetry data to the communications module 606 via the communications interface 612 provided by the API integration as discussed above, and while the compact telemetry data provisioning operations 1102 are illustrated and described as being performed subsequent to the generation of the health report at block 706, one of skill in the art in possession of the present disclosure will appreciate that the compact telemetry data provisioning operations 1102 may be performed prior to the generation of the health report at block 706 while remaining within the scope of the present disclosure as well.

Figure 12:
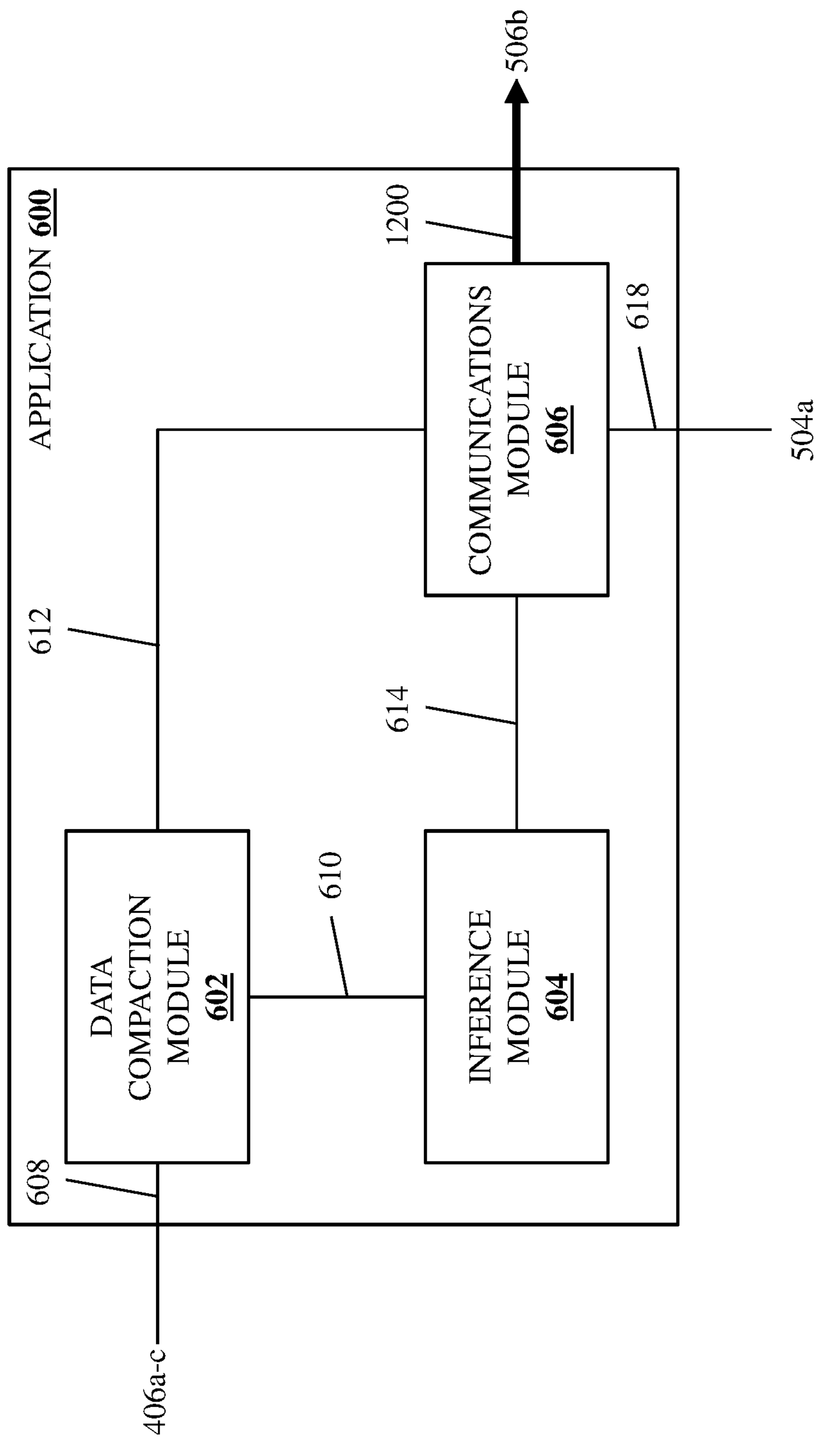
FIG. 12 is a schematic view illustrating an embodiment of the application of FIG. 6 operating during the method of FIG. 7.

With reference to FIG. 12, in some embodiments and following the receiving of the health report, the communications module 606 in the application 504$b$/600 provided by the health report generation engine 404/500 may perform compacted telemetry data and health report storage operations 1200 that may include storing the compacted telemetry data and the health report in the application memory space 506$b$ in the operating system memory 506$a$ of the non-volatile memory subsystem 506 via the communications interface 616 provided by the API integration as discussed above. However, while a specific example of the storage of the compacted telemetry data and the health report has been described, one of skill in the art in possession of the present disclosure will appreciate how the compacted telemetry data and the health report may be stored in other manners that will fall within the scope of the present disclosures as well.

Figure 13A:
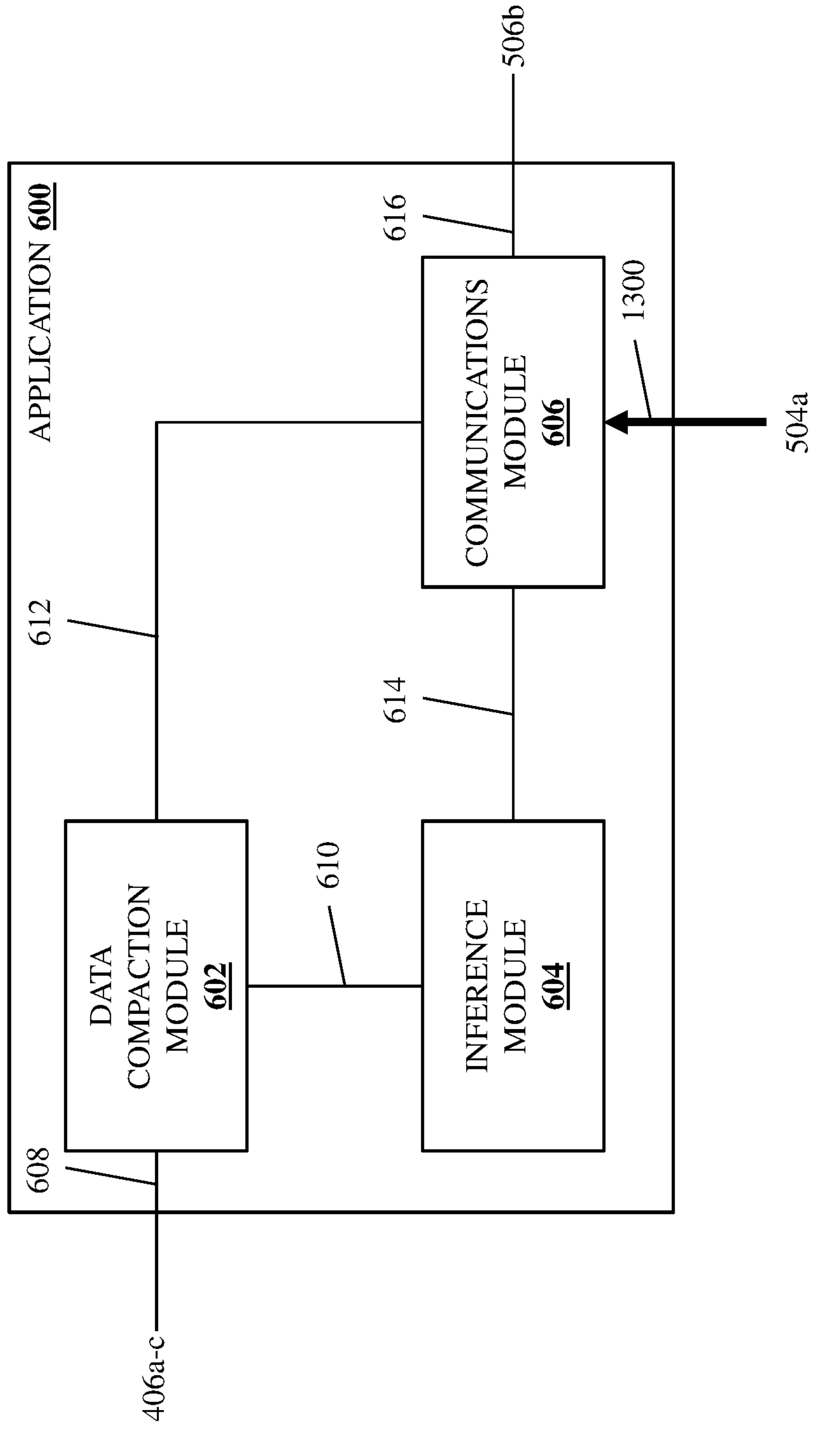
FIG. 13A is a schematic view illustrating an embodiment of the application of FIG. 6 operating during the method of FIG. 7.
Figure 13B:
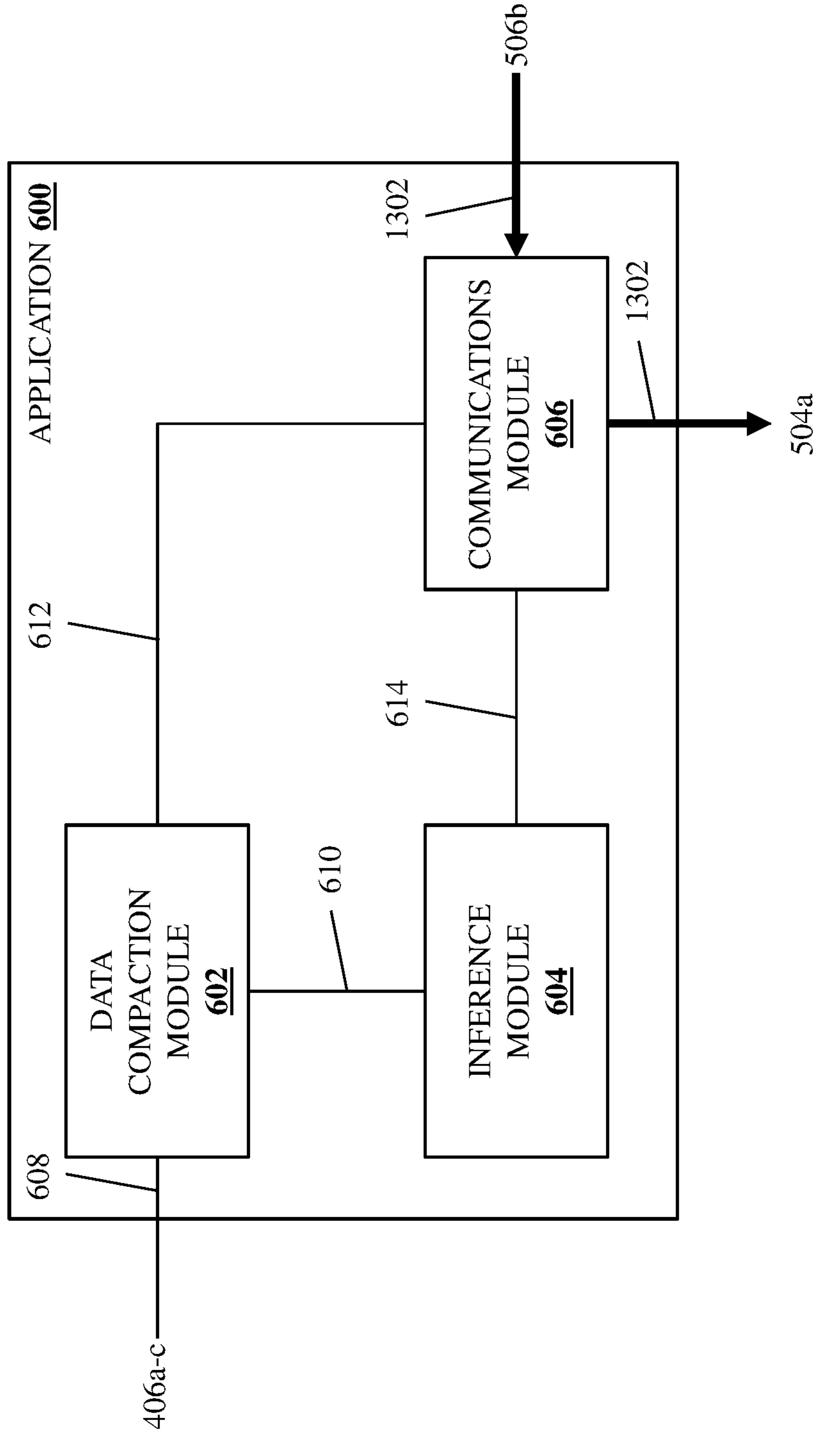
FIG. 13B is a schematic view illustrating an embodiment of the application of FIG. 6 operating during the method of FIG. 7.

The method 700 then proceeds to block 708 where the health report generation subsystem in the component provides the health report to a computing device. In an embodiment, at block 706, the health report generation engine 404 in the computing device component 400 provides the health report generated at block 706 to the computing device 300. With reference to FIG. 13A, in an embodiment of block 708, the communications module 606 in the application 504$b$/600 provided by the health report generation engine 404/500 may perform compacted telemetry data and health report request receiving operations 1300 that may include receiving a request for the compacted telemetry data and/or the health report from the operating system 504$a$ provided in the volatile memory subsystem 504 of the health report generation engine 500 via the communications interface 618 provided by the API integration as discussed above. With reference to FIG. 13B, in an embodiment of block 708 and in response to receiving the request for the compacted telemetry data and/or the health report, the communications module 606 may perform compacted telemetry data and health report request provisioning operations 1302 that may include retrieving the compacted telemetry data and/or the health report from the operating system memory 506$a$ of the non-volatile memory subsystem 506 via the communications interface 616 provided by the API integration as discussed above, and providing the compacted telemetry data and/or the health report to the operating system 504$a$ via the communications interface 618 provided by the API integration as discussed above.

Figure 14A:
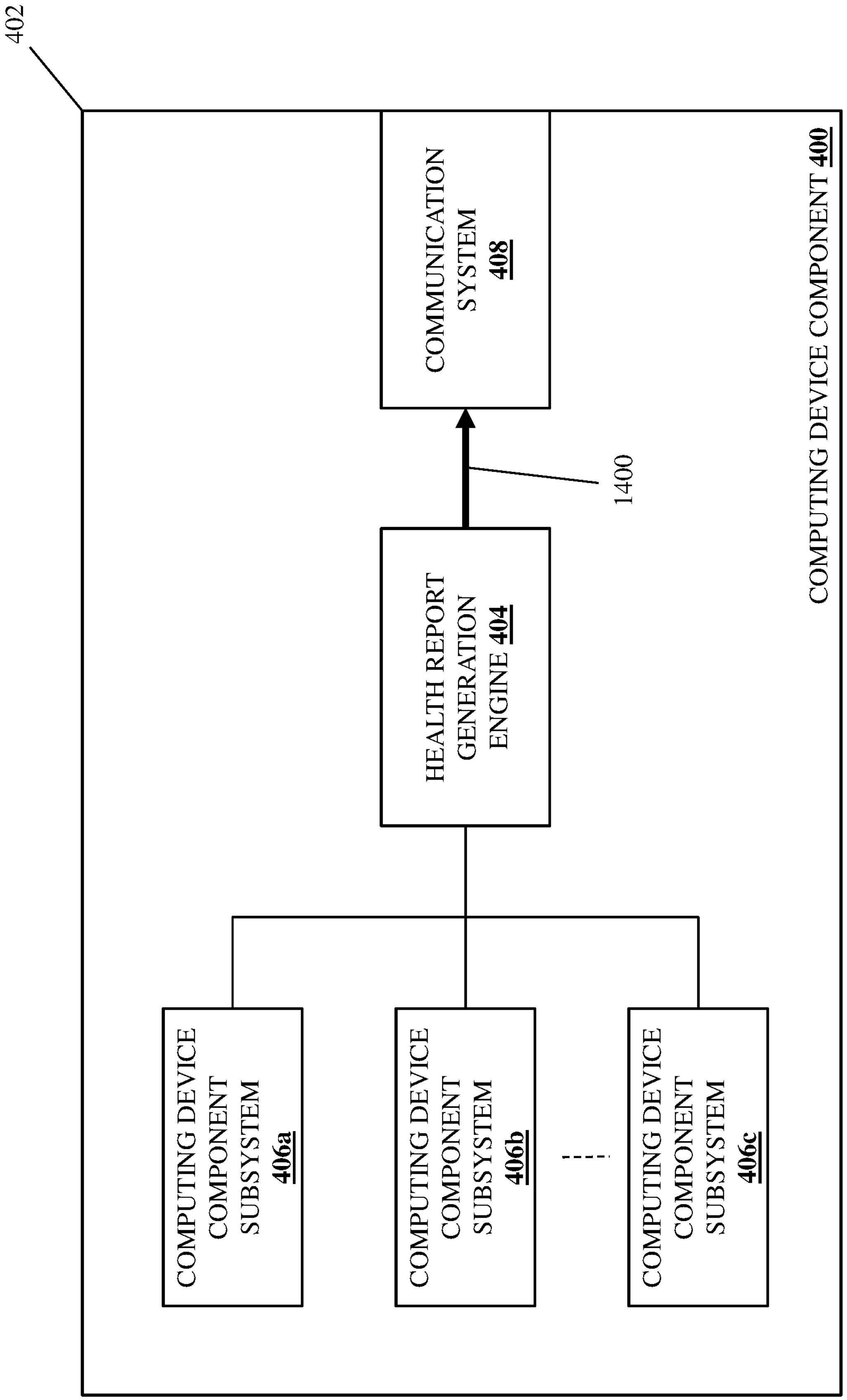
FIG. 14A is a schematic view illustrating an embodiment of the computing device component of FIG. 4 operating during the method of FIG. 7.
Figure 14B:
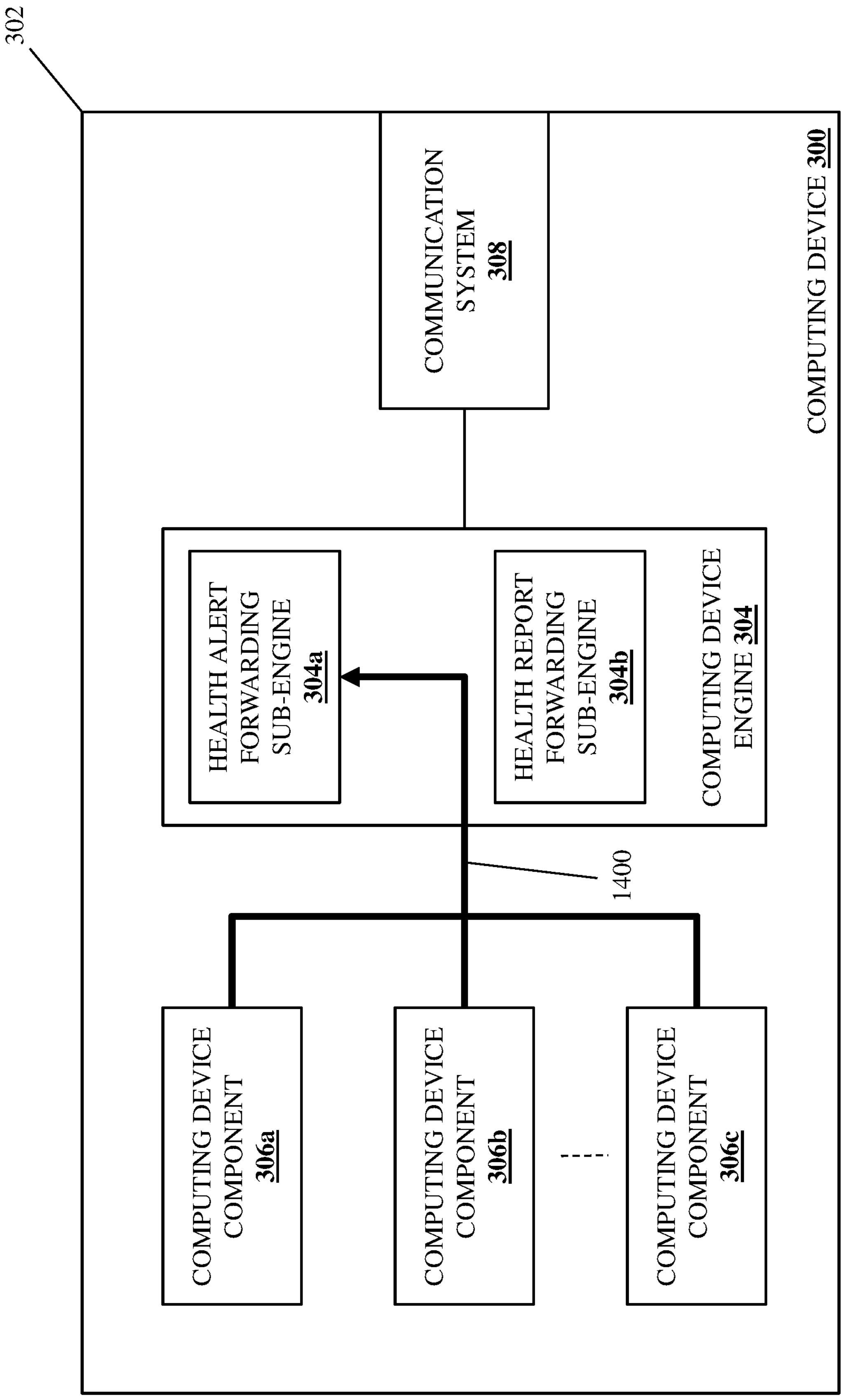
FIG. 14B is a schematic view illustrating an embodiment of the computing device of FIG. 3 operating during the method of FIG. 7.

With reference to FIGS. 14A and 14B, the health report generation engine 404 (e.g., the operating system 504$a$ provided in the volatile memory subsystem 504 of the health report generation engine 404/500) in the computing device components 306$a$-306$c$/400 may perform health report provisioning operations 1400 that may include transmitting the health reports generated by those computing device components 306*a*-306*c*/400 as discussed above via the communication system 408 and to the computing device engine 304 in the computing device 300. In the specific example illustrated in FIG. 14B, the health report is illustrated as being transmitted to the health alert forwarding sub-engine 304*a* in the computing device engine 304, and one of skill in the art in possession of the present disclosure will appreciate how the health alert forwarding sub-engine 304*a* may be configured to identify health alerts included in the health report, and forward those health alerts to the support system 206, provide those health alerts for display on a display device coupled to the computing device 300 (e.g., in order to display the health alert to a user of the computing device), and/or to other health alert subsystems and/or entities that would be apparent to one of skill in the art in possession of the present disclosure. However, while a particular use of the health reports has been described, one of skill in the art in possession of the present disclosure will appreciate that other uses of the health reports of the present disclosure will fall within the scope of the present disclosure as well.

Figure 15A:
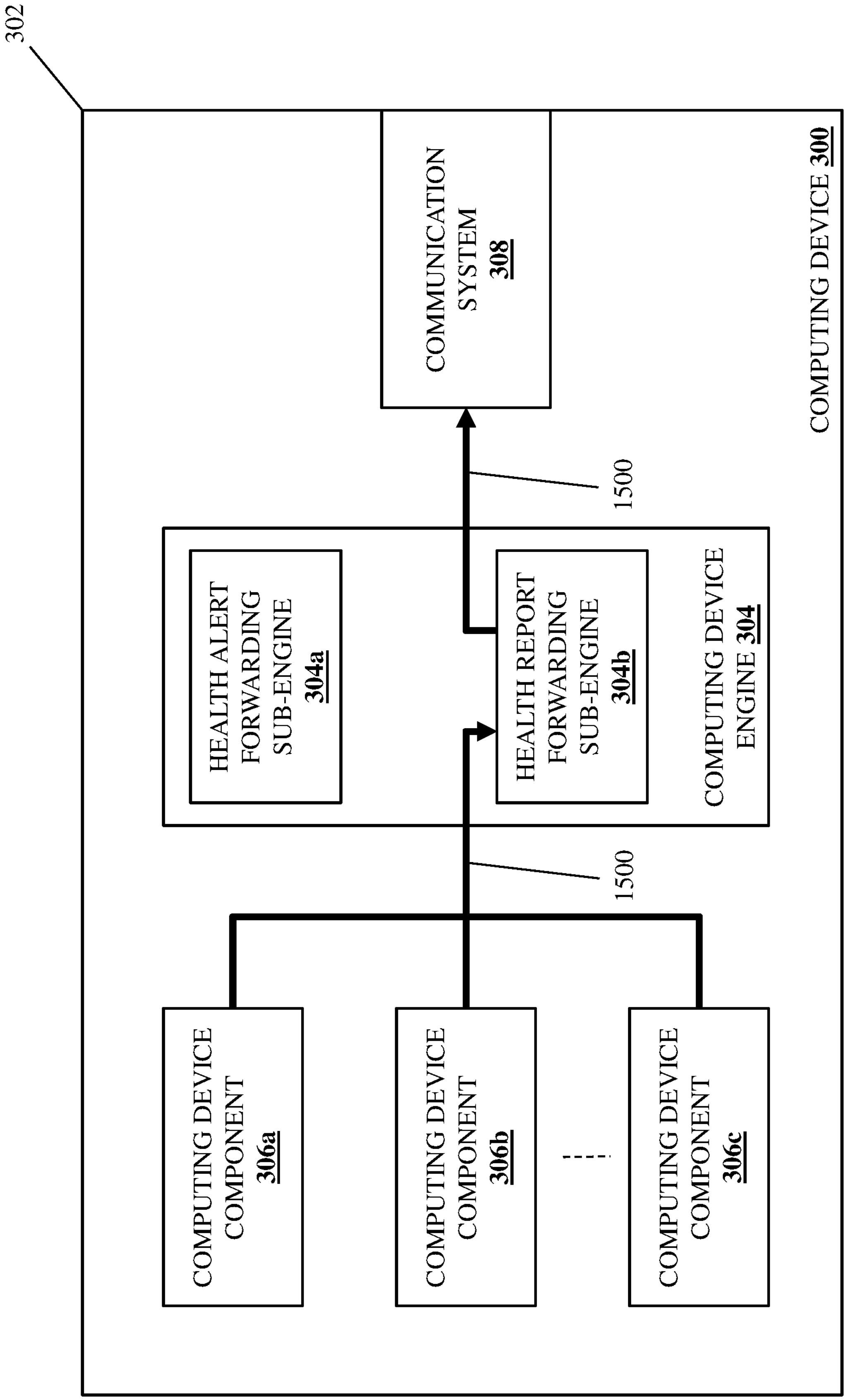
FIG. 15A is a schematic view illustrating an embodiment of the computing device of FIG. 3 operating during the method of FIG. 7.
Figure 15B:
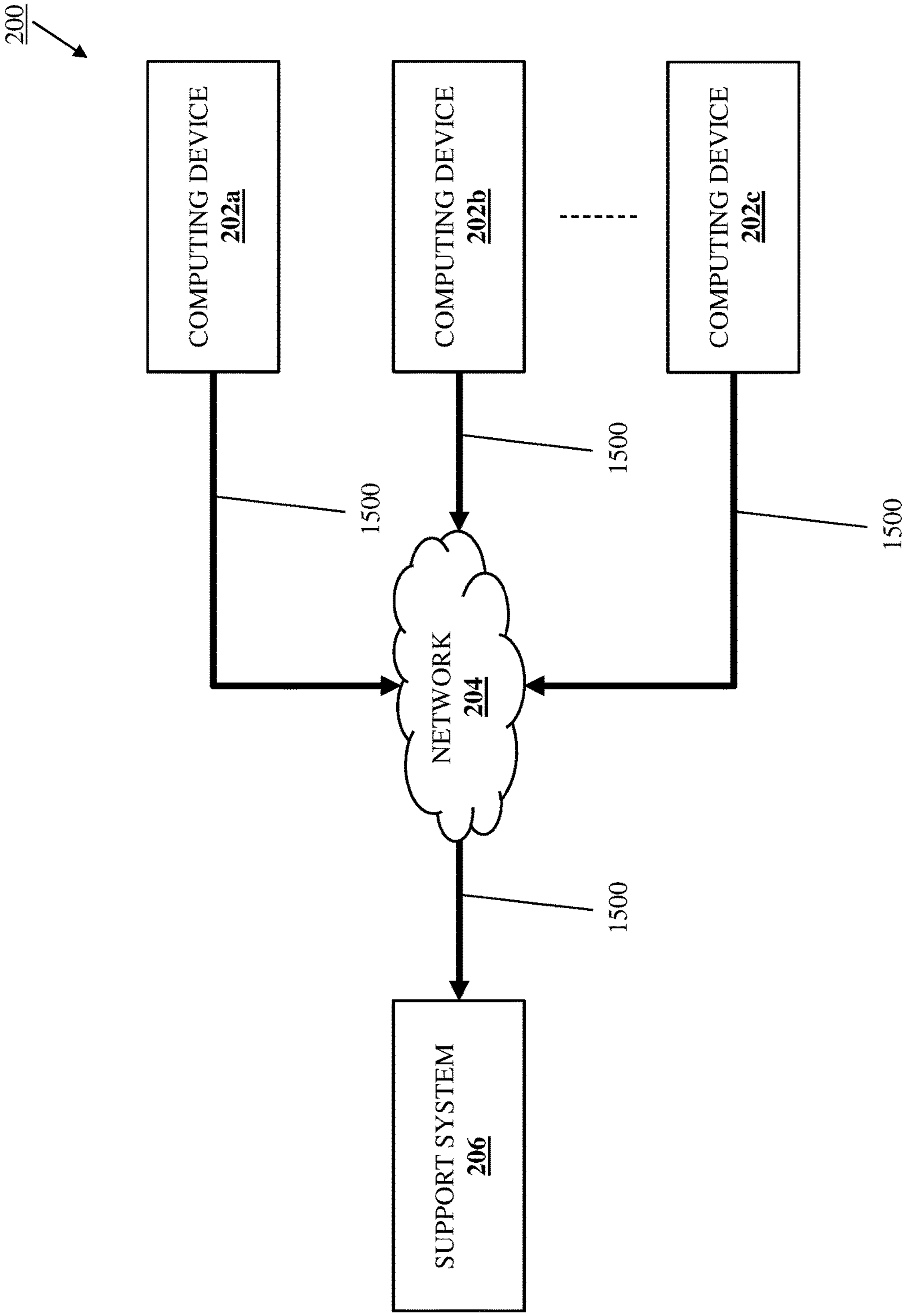
FIG. 15B is a schematic view illustrating an embodiment of the networked system of FIG. 2 operating during the method of FIG. 7.
Figure 16A:
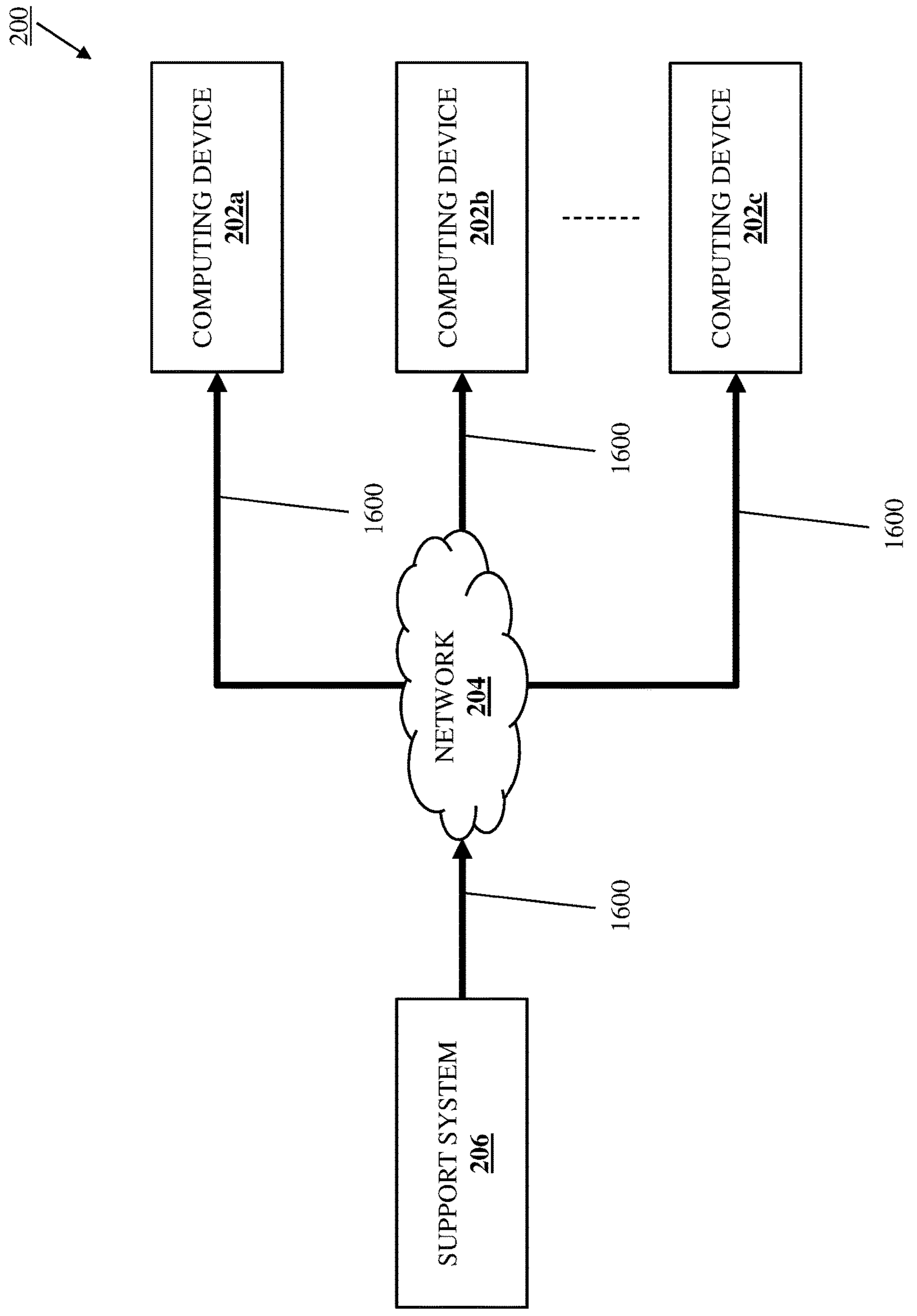
FIG. 16A is a schematic view illustrating an embodiment of the networked system of FIG. 2 operating during the method of FIG. 7.
Figure 16B:
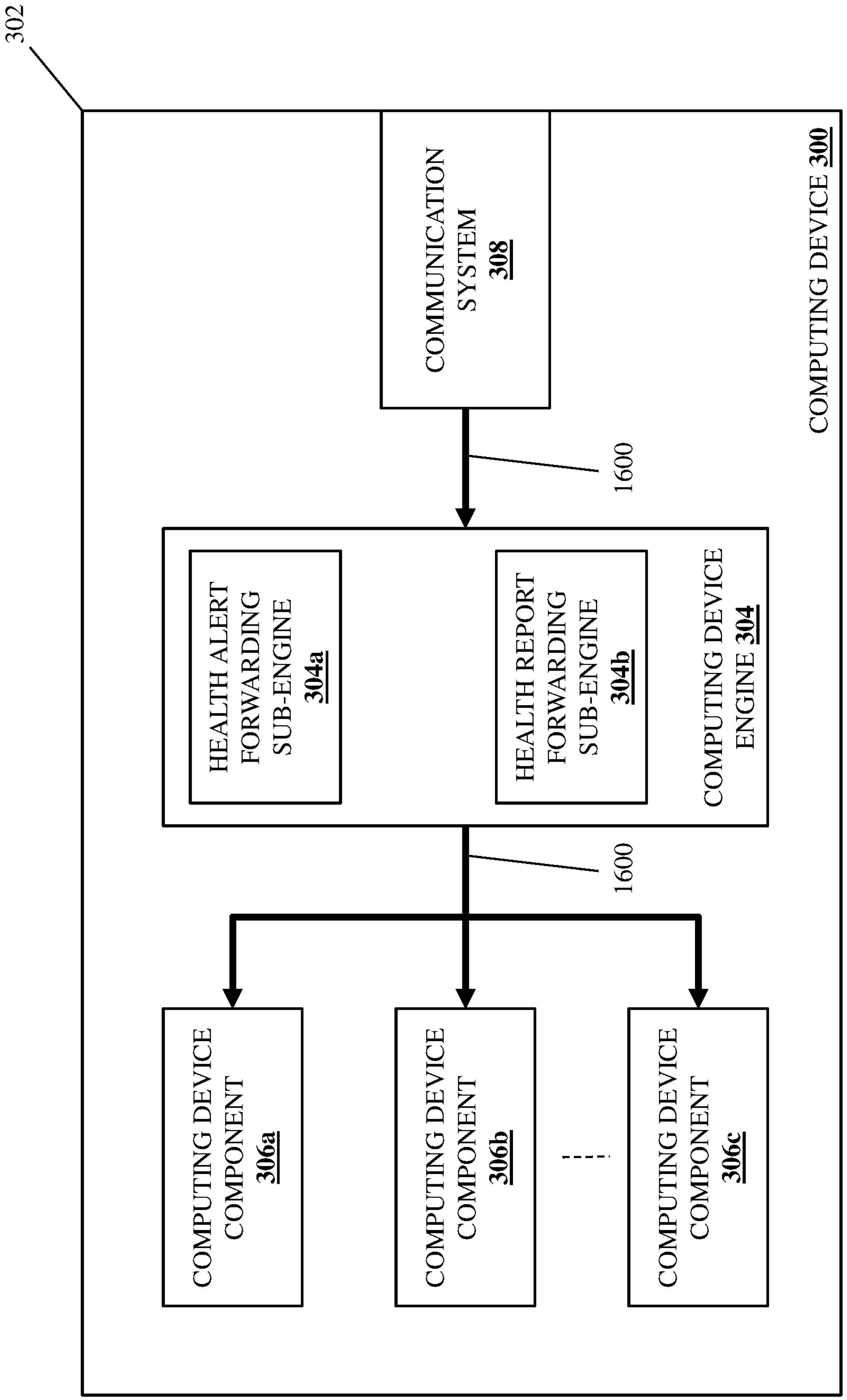
FIG. 16B is a schematic view illustrating an embodiment of the computing device of FIG. 3 operating during the method of FIG. 7.
Figure 16C:
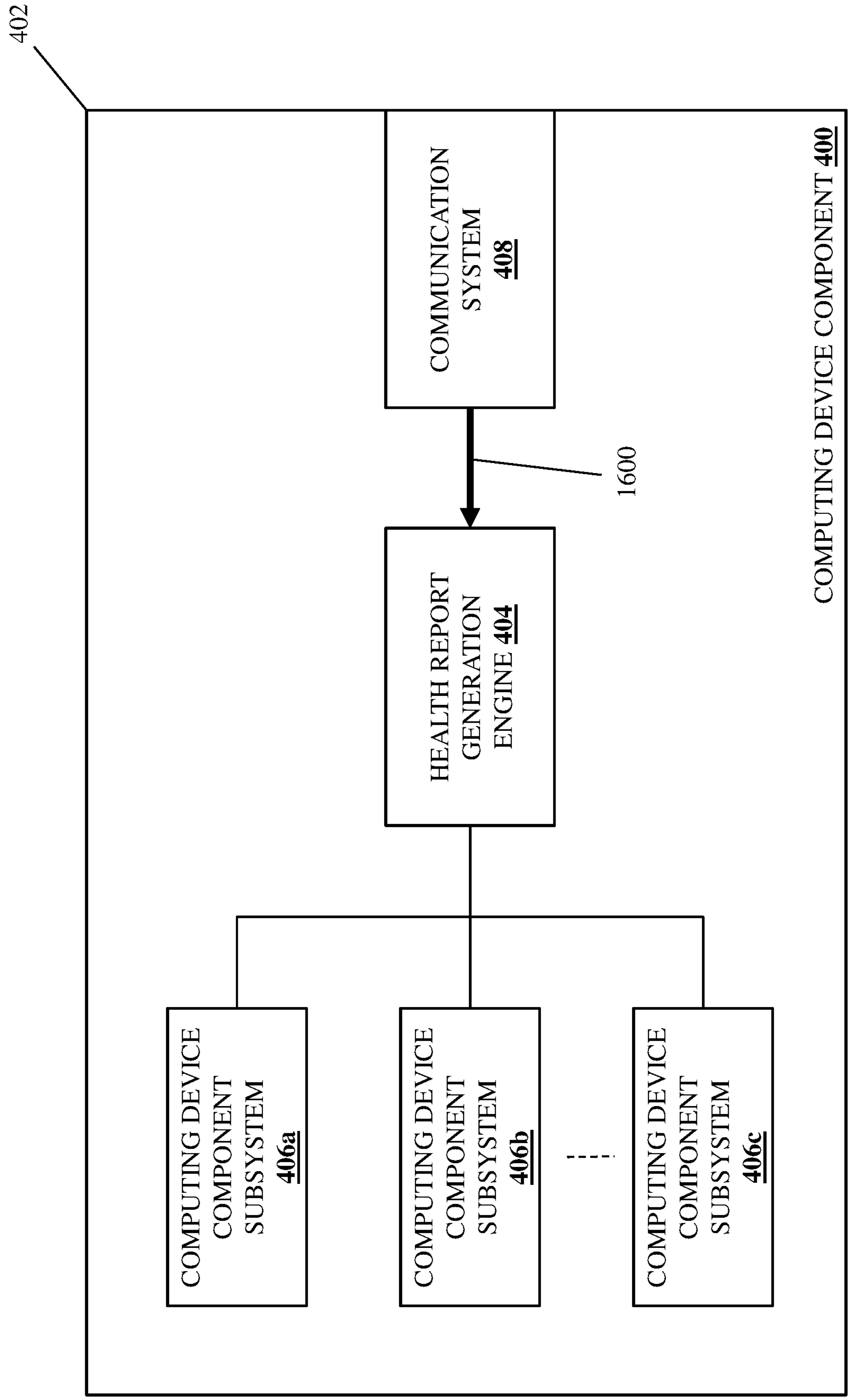
FIG. 16C is a schematic view illustrating an embodiment of the computing device component of FIG. 4 operating during the method of FIG. 7.
Figure 16D:
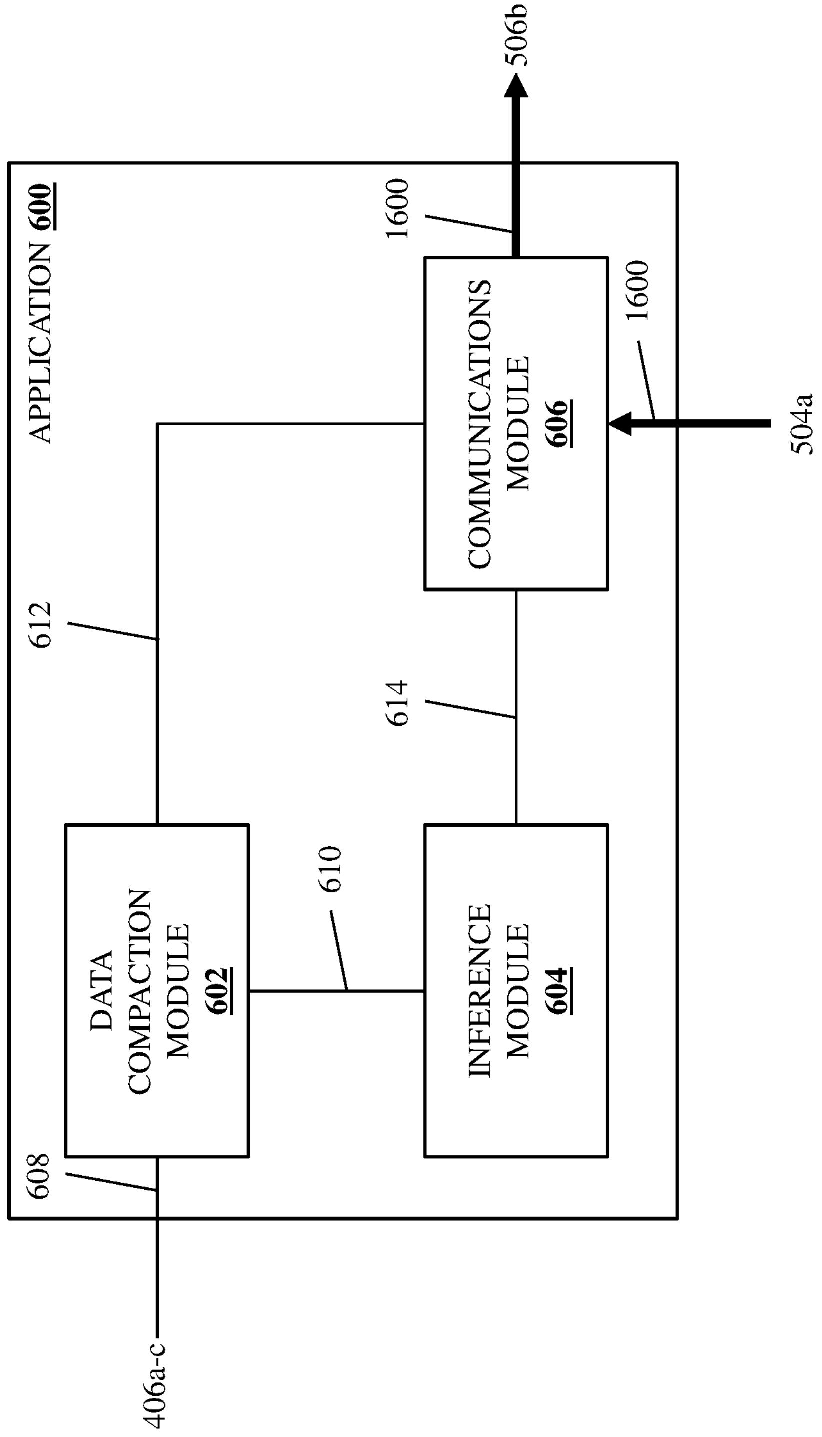
FIG. 16D is a schematic view illustrating an embodiment of the application of FIG. 6 operating during the method of FIG. 7.

The method 700 then proceeds to block 710 where the health report generation subsystem in the component transmits the compacted telemetry data and the health report to a support system. With reference to FIGS. 15A and 15B, the health report generation engine 404 (e.g., the operating system 504*a* provided in the volatile memory subsystem 504 of the health report generation engine 404/500) in the computing device components 306*a*-306*c*/400 may perform compacted telemetry data/health report provisioning operations 1500 that may include transmitting the compacted telemetry data and health reports generated by those computing device components 306*a*-306*c*/400 as discussed above via the communication system 408 and to the health report forwarding sub engine 304*b* in the computing device engine 304 in the computing device 300, with the health report forwarding sub engine 304*b* forwarding the compacted telemetry data and health reports via the communication system 308 and through the network 204 to the support system 206.

The method 700 then proceeds to block 712 where the health report generation subsystem in the component receives updated inference operation parameters from the support system. As discussed above, the support system 206 may utilize compacted telemetry data and health reports like those received at block 710 to perform deep learning training operations on an inference model to identify relationships between the compacted telemetry data and health reports (as well as health issues that are actually experienced by computing device components and that may be provided to the support system 206 using a variety of techniques that would be apparent to one of skill in the art in possession of the present disclosure), and determining updated inference operation parameters based on those identified relationships.

As such, with reference to FIGS. 16A, 16B, 16C, and 16D and in an embodiment of block 712, the support system 206 may perform inference operation parameter provisioning operations 1600 that may include the support system 206 transmitting updated inference operation parameters determined as discussed above via the network 204 and to the computing devices 202*a*-202*c*/300 such that they are received by the computing device engine 304 via the communication system 308 and provided to the computing device components 306*a*-306*c*/400, with the operating system 504*a* provided in the volatile memory subsystem 504 of the health report generation engine 404/500 receiving the updated inference operation parameters, and transmitting those updated inference operation parameters to the communications module 606 in the application 504*b*/600 provided by the health report generation engine 404/500 via the communications interface 618 provided by the API integration as discussed above, and the communications module 606 providing those updated inference operation parameters for storage in the application memory space 506*b* in the operating system memory 506*a* of the non-volatile memory subsystem 506. The method 700 then returns to block 702 where the method 700 may repeat using the updated inference operation parameters at the subsequent performance of block 706.

Thus, systems and methods have been described that provide components that collect telemetry data from their component subsystems, compact that telemetry data to generate compacted telemetry data, and perform inference operations on that compacted telemetry data to generate their own health reports, with those health reports provided to a computing device and possibly resulting in the provisioning of health alerts for the computing device. For example, the component health determination and reporting system of the present disclosure may include a computing device having a computing device component. The computing device component includes computing device component subsystem(s) coupled to a health report generation subsystem. The health report generation subsystem receives telemetry data from each of the computing device component subsystem(s), performs data compaction operations on the telemetry data to generate compacted telemetry data, performs inference operations on the compacted telemetry data to generate a health report for the computing device component, and provides health alert(s) for the computing device based on the health report. As such, the issues with conventional computing device health determination and reporting systems discussed above are remedied.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A component health determination and reporting system, comprising:
- a server;
- a processor that is housed in the server; and
- a storage device that is housed in the server, that is coupled to the processor, and that includes:
  - at least one storage device component that is housed in the storage device; and
  - a health report generation subsystem that is housed in the storage device, that is coupled to each of the at least one storage device component, and that is configured to:
    - receive first telemetry data in a telemetry data stream from each of the at least one storage device component;
    - perform data compaction operations on the first telemetry data to generate compacted telemetry data that provides a compacted representation of the first telemetry data that is derived from the first telemetry data and that is smaller in size than the first telemetry data;
  - discard, subsequent to generating the compacted telemetry data, the first telemetry data;

derive, using second telemetry data that is received in the telemetry data stream subsequent to generating the compacted telemetry data, an update to the compacted telemetry data and apply the update to the compacted telemetry data to generate updated compacted telemetry data;

discard, subsequent to generating the updated compacted telemetry data, the second telemetry data;

perform inference operations on the updated compacted telemetry data to generate a health report for the storage device; and provide the health report to the processor in the server.

2. The system of claim 1, further comprising:

a support system that is coupled to the computing device via a network, wherein the health report generation subsystem is configured to:

receive, from the support system via the network, first inference operation parameters; and utilize the first inference operation parameters in the inference operations.

3. The system of claim 2, wherein the health report generation subsystem is configured to:

transmit the updated compacted telemetry data via the network to the support system;

receive, from the support system via the network, second inference operation parameters that are different from the first inference operation parameters, that were generated by the support system based on the updated compacted telemetry data, and that are configured for use in a subsequent performance of the inference operations in place of the first inference operation parameters.

4. The system of claim 3, wherein the support system is configured to:

train, using the updated compacted telemetry data, a deep learning health report generation model to generate the second inference operation parameters.

5. The system of claim 1, wherein the compacted representation of the first telemetry data includes a respective mean of each set of time-series data in the first telemetry data and a respective standard deviation of each set of time-series data in the first telemetry data.

6. The system of claim 1, wherein the data compaction operations generate the compacted telemetry data such that the compacted telemetry data is free of anomalies that are present in the telemetry data stream.

7. The system of claim 1, wherein the storage device is a Non-Volatile Memory express (NVMe) storage device.

8. A storage device, comprising:

a server mounting subsystem that is configured to mount the storage device in a server;

a storage device processor that is included in the storage device; and a storage device memory that is included in the storage device, that is coupled to the storage device processor, and that includes instructions that, when executed by the storage device processor, cause the storage device processor to provide a health report generation engine that is configured to:

receive first telemetry data in a telemetry data stream from each of at least one storage device component included in the storage device;

perform data compaction operations on the first telemetry data to generate compacted telemetry data that provides a compacted representation of the first telemetry data that is derived from the first telemetry data and that is smaller in size than the first telemetry data;

discard, subsequent to generating the compacted telemetry data, the first telemetry data;

derive, using second telemetry data that is received in the telemetry data stream subsequent to generating the compacted telemetry data, an update to the compacted telemetry data and apply the update to the compacted telemetry data to generate updated compacted telemetry data;

discard, subsequent to generating the updated compacted telemetry data, the second telemetry data;

perform inference operations on the updated compacted telemetry data to generate a health report for the storage device; and provide the health report to a processor in a server when the storage device is mounted in the server.

9. The storage device of claim 8, wherein the health report generation engine is configured to:

receive, from a support system via a network, first inference operation parameters; and utilize the first inference operation parameters in the inference operations.

10. The storage device of claim 9, wherein the health report generation engine is configured to:

transmit the updated compacted telemetry data via the network to the support system;

receive, from the support system via the network, second inference operation parameters that are different from the first inference operation parameters, that were generated by the support system based on the updated compacted telemetry data, and that are configured for use in a subsequent performance of the inference operations in place of the first inference operation parameters.

11. The storage device of claim 8, wherein the compacted representation of the first telemetry data includes a respective mean of each set of time-series data in the first telemetry data and a respective standard deviation of each set of time-series data in the first telemetry data.

12. The storage device of claim 8, wherein the data compaction operations generate the compacted telemetry data such that the compacted telemetry data is free of anomalies that are present in the telemetry data stream.

13. The storage device of claim 8, wherein the storage device is a Non-Volatile Memory express (NVMe) storage device.

14. A method for determining and reporting component health, comprising:

receiving, by a health report generation subsystem in a storage device that is housed in a server, first telemetry data in a telemetry data stream from each of at least one storage device component that is housed in the storage device;

performing, by the health report generation subsystem, data compaction operations on the first telemetry data to generate compacted telemetry data that provides a compacted representation of the first telemetry data that is derived from the first telemetry data and that is smaller in size than the first telemetry data;

discarding, by the health report generation subsystem subsequent to generating the compacted telemetry data, the first telemetry data;

deriving, by the health report generation subsystem using second telemetry data that is received in the telemetry data stream subsequent to generating the compacted telemetry data, an update to the compacted telemetry data and apply the update to the compacted telemetry data to generate updated compacted telemetry data;

discarding, by the health report generation subsystem subsequent to generating the updated compacted telemetry data, the second telemetry data;

performing, by the health report generation subsystem, inference operations on the updated compacted telemetry data to generate a health report for the storage device; and providing, by the health report generation subsystem, the health report to a processor in the server.

15. The method of claim 14, further comprising:

receiving, by the health report generation subsystem from a support system via a network, first inference operation parameters; and utilizing, by the health report generation subsystem, the first inference operation parameters in the inference operations.

16. The method of claim 15, further comprising:

transmitting, by the health report generation subsystem, the updated compacted telemetry data via the network to the support system;

receiving, by the health report generation subsystem from the support system via the network, second inference operation parameters that are different from the first inference operation parameters, that were generated by the support system based on the updated compacted telemetry data, and that are configured for use in a subsequent performance of the inference operations in place of the first inference operation parameters.

17. The method of claim 16, further comprising:

training, by the support system using the updated compacted telemetry data, a deep learning health report generation model to generate the second inference operation parameters.

18. The method of claim 14, wherein the compacted representation of the first telemetry data includes a respective mean of each set of time-series data in the first telemetry data and a respective standard deviation of each set of time-series data in the first telemetry data.

19. The method of claim 14, wherein the data compaction operations generate the compacted telemetry data such that the compacted telemetry data is free of anomalies that are present in the telemetry data stream.

20. The method of claim 14, wherein the storage device is a Non-Volatile Memory express (NVMe) storage device.

* * * * *